US009436709B1

(12) United States Patent
Anima et al.

(10) Patent No.: US 9,436,709 B1
(45) Date of Patent: Sep. 6, 2016

(54) CONTENT DISCOVERY IN A TOPICAL COMMUNITY

(71) Applicant: Google Inc., Mountain View, CA (US)

(72) Inventors: Mario Ventura Anima, Sunnyvale, CA (US); Ralph Jacob Cressman, San Francisco, CA (US); Kevin Ferguson, San Francisco, CA (US); Mikhail Dhruv, Palo Alto, CA (US); Vinay Jain, Sunnyvale, CA (US); Jeremy Lazarus, San Francisco, CA (US); Benson Luk, San Francisco, CA (US); Umanka Hebbar Karkada, Mountain View, CA (US); Steve Tsai, Mountain View, CA (US); James Rodgers, Mountain View, CA (US); Fengjia Li, Mountain View, CA (US); Paul Sowden, Palo Alto, CA (US); Jared Hirsch, Mountain View, CA (US)

(73) Assignee: Google Inc., Mountain View, CA (US)

( * ) Notice: Subject to any disclaimer, the term of this patent is extended or adjusted under 35 U.S.C. 154(b) by 628 days.

(21) Appl. No.: 13/743,263

(22) Filed: Jan. 16, 2013

(51) Int. Cl.
G06F 17/00 (2006.01)
G06F 17/30 (2006.01)

(52) U.S. Cl.
CPC .............. G06F 17/30283 (2013.01)

(58) Field of Classification Search
CPC ............ G06F 17/3053; G06F 17/30616; G06F 17/30663; G06F 17/30283
USPC .......... 707/748, 738, 727, 999.002
See application file for complete search history.

(56) References Cited

U.S. PATENT DOCUMENTS

| 7,827,052 | B2* | 11/2010 | Scott et al. | 705/7.11 |
|---|---|---|---|---|
| 8,554,601 | B1* | 10/2013 | Marsh et al. | 705/7.32 |
| 8,756,050 | B1* | 6/2014 | Harkness et al. | 704/2 |
| 8,793,255 | B1* | 7/2014 | Bilinski et al. | 707/740 |
| 2006/0080161 | A1* | 4/2006 | Arnett et al. | 705/10 |
| 2007/0078675 | A1* | 4/2007 | Kaplan | 705/1 |
| 2008/0082548 | A1* | 4/2008 | Betts | 707/10 |
| 2008/0120376 | A1* | 5/2008 | Allsop | 709/204 |
| 2009/0125382 | A1* | 5/2009 | Delepet | 705/10 |
| 2009/0157490 | A1* | 6/2009 | Lawyer | 705/11 |
| 2010/0131640 | A1* | 5/2010 | Carter | 709/224 |
| 2010/0162093 | A1* | 6/2010 | Cierniak | 715/205 |
| 2011/0231296 | A1* | 9/2011 | Gross et al. | 705/37 |

(Continued)

OTHER PUBLICATIONS

Wavii, http:wavii.com/about, Instant News Feeds, printed Jan. 15, 2013, 2 pages.

Primary Examiner — Mohammed R Uddin
(74) Attorney, Agent, or Firm — Patent Law Works LLP

(57) ABSTRACT

The disclosure includes a system and method for discovering content in a topical community. The system includes a processor and a memory storing instructions when executed cause the system to: receive data indicating a first engagement action associated with a content item, the first engagement action performed by a first user; determine a topic associated with the content item; determine a topical reputation score related to the topic for the first user based on one or more second engagement actions performed by one or more second users associated with the content item; determine that the topical reputation score satisfies a reputation threshold; unlock the topic for the first user responsive to the determination that the topical reputation score satisfies the reputation threshold and provide the first user an ability to curate other content items associated with the unlocked topic.

20 Claims, 34 Drawing Sheets

(56) References Cited

U.S. PATENT DOCUMENTS

| | | | |
|---|---|---|---|
| 2011/0313988 A1* | 12/2011 | Ghosh et al. | 707/706 |
| 2012/0005224 A1* | 1/2012 | Ahrens et al. | 707/769 |
| 2012/0215773 A1* | 8/2012 | Si et al. | 707/723 |
| 2012/0246230 A1* | 9/2012 | Ferbar et al. | 709/204 |
| 2012/0296920 A1* | 11/2012 | Sahni et al. | 707/749 |
| 2013/0018957 A1* | 1/2013 | Parnaby et al. | 709/204 |
| 2013/0179511 A1* | 7/2013 | Stevens et al. | 709/204 |
| 2015/0135058 A1* | 5/2015 | Metcalf et al. | 715/234 |

* cited by examiner

530

| Home | Topics |

Share a URL [ Share ]

Favorite Topics:

Topic 5
Topic 6
Topic 7
Topic 8

For you | Recently Shared

Topics

| Topic 1 ☆ ⊗ | Topic 2 ☆ ⊗ |
| Topic 3 ☆ ⊗ | Topic 4 ☆ ⊗ |

View more Topics >>

Build your personal feed...

Image 8

How to catch a fish
website8.com   Latest activity 1 hour ago
If you know the appropriate fish dance, you do not need the typical gear you see anglers carry around...
Topics: Topic 1 and Topic 2
Share 1   1                                           — 532

Image 9

Vote for the Best Actress of the Year
website9.com   Latest activity 1 hour ago
Who is your favorite actress of this year? Vote for her here...
Topics: Topic 3
Share 10   4

| | How to catch a fish |
|---|---|
| Image 18 | website8.com    Latest activity 1 hour ago |
| | If you know the appropriate fish dance, you do not need the typical gear you see anglers carry around... |

Topics: <u>fishing gear</u> and <u>fishing education</u>

Share 1   💬 1

> Fishing education
> ☆ Add to favorites

572

Leave a comment here. . .

| Share a URL | |
|---|---|

Recently shared

How to catch a fish using a dance
website1.com      Latest activity 1 hour ago Image 1

If you know the appropriate fish dance, you do not need the typical gear you see anglers carry around...
Topics: Fishing education    Fishing    Fishing gear Share 1  💬 1

Share

User A

Shares  Clicks
1,249   4,398

Following 105

Followers 87

Choose from your favorites:
Topic 2  Topic 3  Topic 4

Suggest a topic add

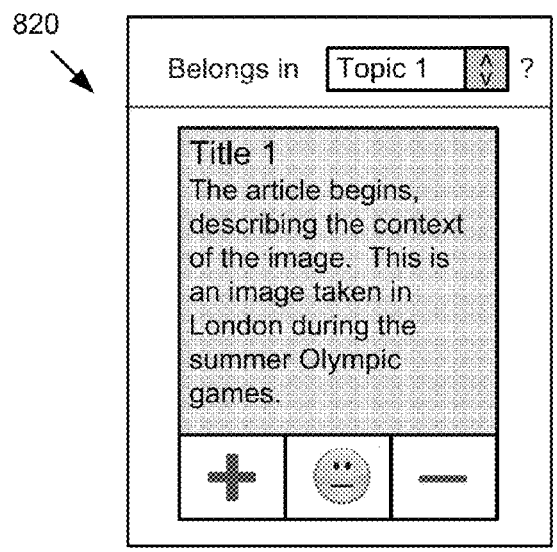
Figure 8C
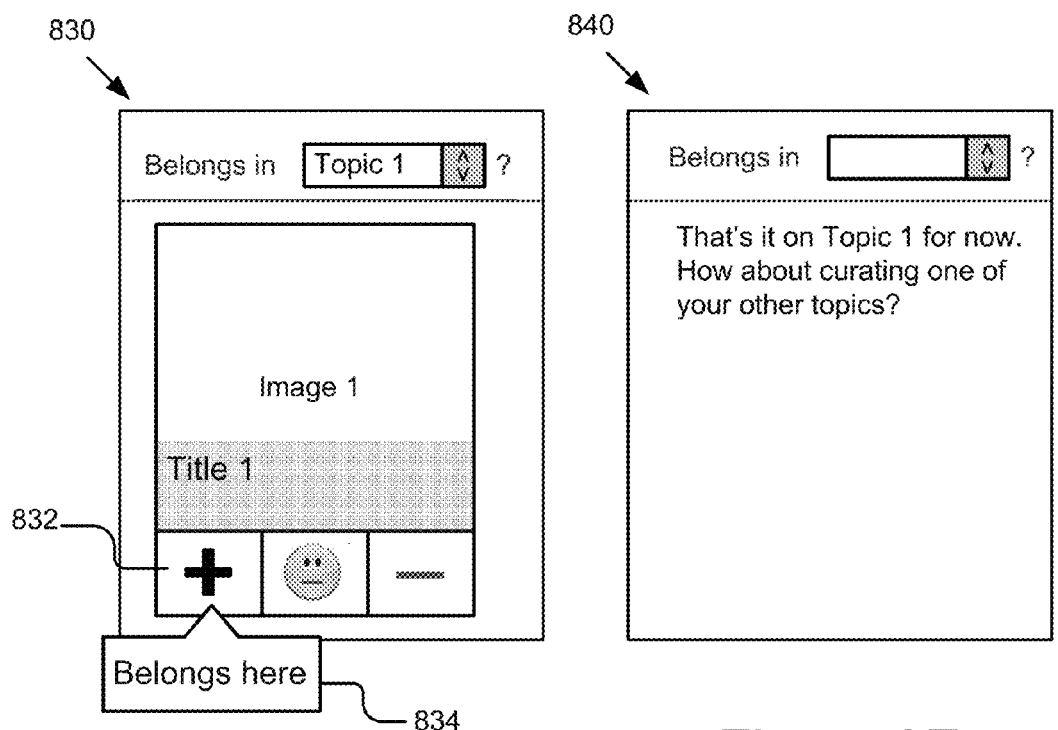
Figure 8D
Figure 8E

Figure 10

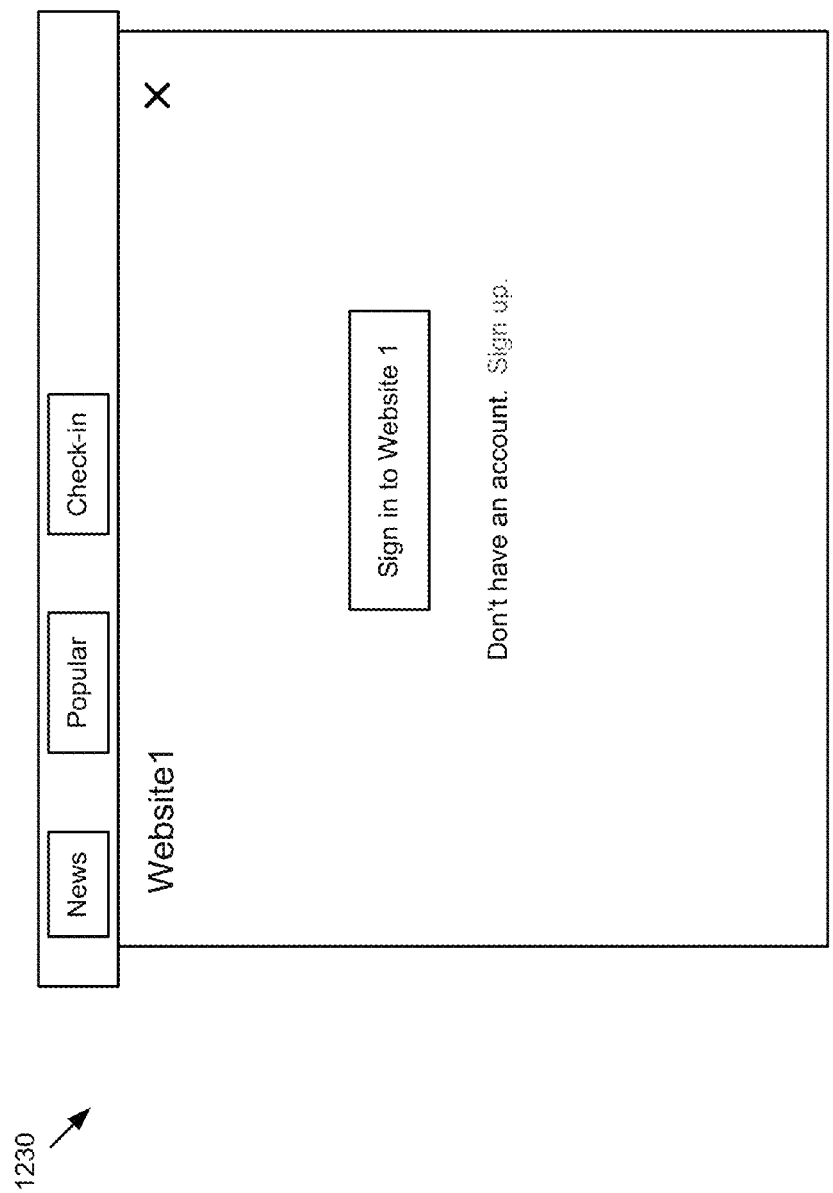

CONTENT DISCOVERY IN A TOPICAL COMMUNITY

BACKGROUND

The specification relates to providing content to users.

Over the last decade, online networking has become increasingly popular. People frequently share content (e.g., videos, posts, comments, photos, movie reviews, book reviews, etc.) with other users in a social network. For example, a first user can connect to a second user in a social network and receive content shared by the second user in the social network via a social feed. However, in some instances the first user may merely want to receive the second users' shared content associated with a specific topic and may not want to receive other content irrelevant to the topic. Furthermore, a user may want to know who can be a reputable contributor for a topic that provides valuable content related to the topic and then subscribe to the reputable contributor's shared content under the topic.

SUMMARY

According to one innovative aspect of the subject matter described in this disclosure, a system for discovering content in a topical community includes: a processor; and a memory storing instructions that, when executed, cause the system to: receive data indicating an engagement action associated with a content item, the engagement action performed by a first user; determine a topical reputation score related to the topic for the first user based on one or more other engagement actions that are associated with the content item; receive data describing a second action performed by a second user on the content item, where the second user has abilities to curate content items associated with a topic for the content item; determine a first set of impact scores for the second action performed by the second user; and adjust the first topical reputation score for the first user based on the impact score.

In general, another innovative aspect of the subject matter described in this disclosure may be embodied in methods that include: receiving data indicating a first engagement action associated with a content item, the first engagement action performed by a first user; determining a topic associated with the content item; determining a topical reputation score related to the topic for the first user based on one or more second engagement actions performed by one or more second users with the content item; determining that the topical reputation score satisfies a reputation threshold; unlocking the topic for the first user responsive to the determination that the topical reputation score satisfies the reputation threshold; and providing the first user with an ability to curate other content items associated with the unlocked topic.

Another innovative aspect of the subject matter described in this disclosure may be embodied in methods that include: receiving data indicating en engagement action associated with a content item, the engagement action performed by a first user; determining a topical reputation score related to the topic for the first user based on one or more other engagement actions associated with the content item; receiving data describing a second action performed by a second user on the content item, where the second user has abilities to curate content items associated with a topic for the content item; determining a first set of impact scores for the second action performed by the second user; and adjusting the first topical reputation score for the first user based on the impact score.

Other implementations of one or more of these aspects include corresponding systems, apparatus, and computer programs, configured to perform the actions of the methods, encoded on computer storage devices.

These and other implementations may each optionally include one or more of the following features. For instance, the features include: the first engagement action including the first user publishing a uniform resource locator associated with the content item; the one or more second engagement actions including an indication of whether the one or more second users approve of the content item; the ability to curate including giving the first user the ability to control how one or more second content items appear in a feed associated with a topic; the one or more second content items being provided by one or more third users that are different than the first user; the second action being a management action and the first set of impact scores including a first impact score generated by the management action and a second impact score generated by a new engagement action established upon the management action; adjusting the first topical reputation score comprising adjusting the first topical reputation score based on a weighted sum of the first impact score and the second impact score; the second action being a management action that includes an acknowledgement of relevance between the content item and the topic; the first set of impact scores including a time-evolving modeling of one or more impact scores that affect the first topical reputation score; and the engagement action including sharing a uniform resource locator associated with a content item.

The present disclosure may be particularly advantageous in a number of respects. First, the system enables a first user to subscribe to content shared by a second user on a topical basis. Second, the system grants administrative rights related to a topic to a user based on content meritocracy. For example, the system provides administrative rights of a topic to a reputable contributor who provides valuable content to the topic. The system unlocks the topic for the reputable contributor so that the reputable contributor can manage the unlocked topic and other users can subscribe to the reputable contributor's unlocked topic. Third, the system determines a topical reputation score associated with a topic for a user based on one or more of: (1) the content shared by the user under the topic; (2) relevance of the shared content and the topic; and (3) other users' engagement actions and/or management actions. A set of impact scores can be generated and used to adjust the topical reputation score. Fourth, the system determines an interest profile associated with a user and provides an interest-based stream to the user. The system refines a topic structure included in the interest profile based on the user's engagement actions on the interest-based stream.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5B and 5C are graphic representations of example user interfaces for establishing an interest profile for a user.

FIG. 5G is a graphic representation of an example user interface for recommending a topic to a user.

FIG. 7 is a graphic representation of an example user interface for providing a topic recommendation to a user.

FIGS. 8A-8E are graphic representations of example user interfaces for editing a topic for a content item.

FIG. 10 is a graphic representation of an example user interface for adding a content source to a topic.

FIGS. 12A-12E are graphic representations of example user interfaces for unlocking a topic for a user.

DETAILED DESCRIPTION

Figure 1:
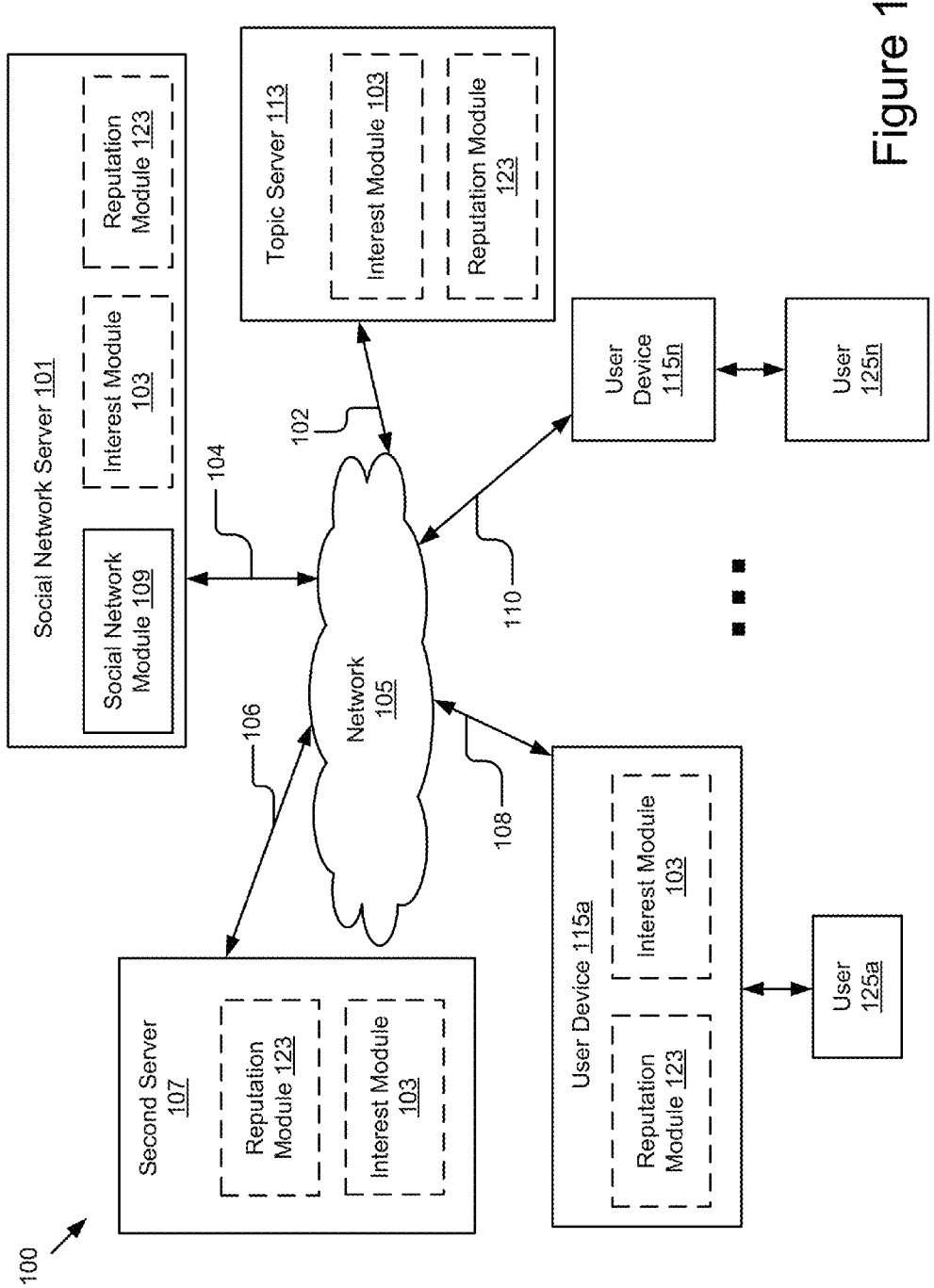
FIG. 1 is a block diagram illustrating an example system for discovering content in a topical community.

FIG. 1 illustrates a block diagram of some implementations of a system 100 for discovering content in a topical community. The illustrated system 100 includes user devices 115a . . . 115n that can be accessed by users 125a . . . 125n, a social network server 101, a second server 107 and a topic server 113. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated implementation, these entities of the system 100 are communicatively coupled via a network 105.

The user devices 115a, 115n in FIG. 1 are used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the second server 107 and the topic server 113, in practice one or more networks 105 can be connected to these entities.

In some instances, the interest module 103 and/or the reputation module 123 may be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the topic server 113 and the second server 107 via the network 105. The social network server 101 includes a social network module 109. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network module 109 may be representative of one social network and that there may be multiple social networks coupled to the network 105, each having its own server, module and social graph. For example, a first social network may be more directed to business networking, a second may be more directed to or centered on academics, a third may be more directed to local business, a fourth may be directed to dating and others may be of general interest or a specific focus.

In some instances, the interest module 103 and/or the reputation module 123 may be stored on a second server 107, which is connected to the network 105 via signal line 106. In some implementations, the second server 107 can be a hardware server that includes a processor, a memory and network communication capabilities. The second server 107 sends and receives data to and from other entities of the system 100 via the network 105. While FIG. 1 includes one second server 107, the system 100 may include one or more third-party servers 107.

In some instances, the interest module 103 and/or the reputation module 123 may be stored on a topic server 113, which is connected to the network 105 via signal line 102. In some implementations, the topic server 113 can be a hardware server that includes a processor, a memory and network communication capabilities. The topic server 113 sends and receives data to and from other entities of the system 100 via the network 105. While FIG. 1 includes one topic server 113, the system 100 may include one or more topic servers 113.

In some instances, the interest module 103 and/or the reputation module 123 may be stored on a user device 115a, which is connected to the network 105 via signal line 108. In some implementations, the user device 115a, 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user 125a interacts with the user device 115a. The user device 115n is communicatively coupled to the network 105 via signal line 110. The user 125n interacts with the user device 115n. In some instances, each of the interest module 103 and the reputation module 123 acts in part as a thin-client application that may be stored on the user devices 115a, 115n and in part as components that may be stored on one or more of the social network server 101, the topic server 113 and the second server 107.

In some implementations, the interest module 103 and the reputation module 123 can be stored in the same server or device. In some other implementations, the interest module 103 and the reputation module 123 may be stored in different servers or devices.

The interest module 103 can be code and routines for providing an interest-based stream to a user. In some instances, the interest module 103 can be implemented using hardware including a field-programmable gate array (FPGA) or an application-specific integrated circuit (ASIC). In some other instances, the interest module 103 can be implemented using a combination of hardware and software. In some instances, the interest module 103 may be stored in a combination of the devices and servers, or in one of the devices or servers. The interest module 103 is described below in more detail with reference to FIGS. 2B-4C.

The reputation module 123 can be code and routines for managing a topical community. In some instances, the reputation module 123 can be implemented using hardware including a field-programmable gate array (FPGA) or an application-specific integrated circuit (ASIC). In some other instances, the reputation module 123 can be implemented using a combination of hardware and software. In some instances, the reputation module 123 may be stored in a combination of the devices and servers, or in one of the devices or servers. The reputation module 123 is described below in more detail with reference to FIGS. 2A and 6A-6D.

A topical community can be a community established based on various topics. In some implementations, a topical community establishes a network of connections via topics and users in the topical community share content on a topical basis. In some implementations, a topical community can be established based on a social graph and form a social network focusing on sharing content on a topical basis.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. In some implementations, the modules 103, 109, 123 can be stored in different servers or devices, and some of the functionality of the modules 103, 109, 123 can be provided by other modules 103, 109, 123.

Figure 2A:
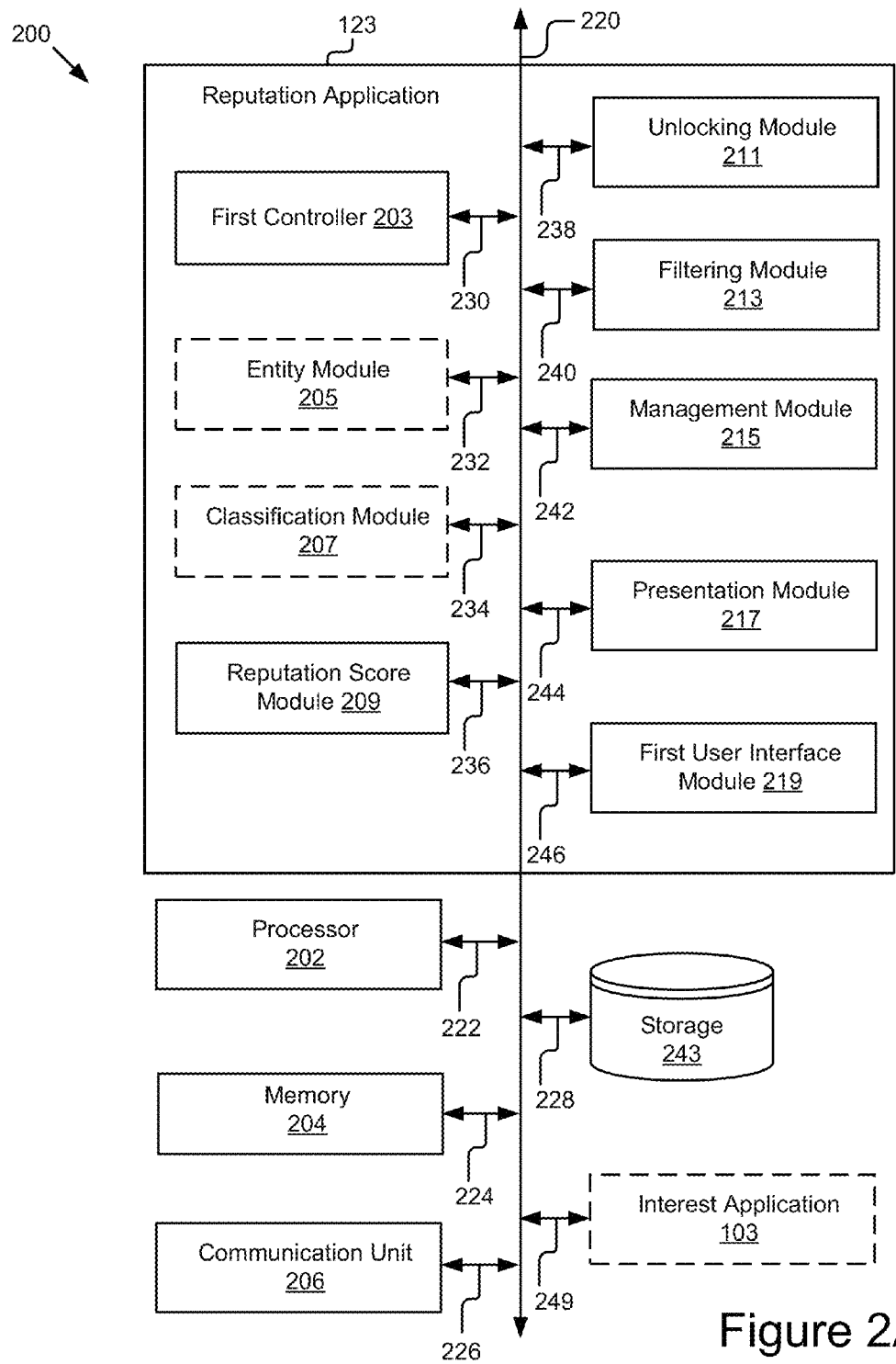
FIG. 2A is a block diagram illustrating an example of a reputation module.

Referring now to FIG. 2A, an example of the reputation module 123 is shown in more detail. FIG. 2A is a block diagram of a computing device 200 that includes a reputation module 123, a processor 202, a memory 204, a communication unit 206 and a storage device 243 according to some examples. Optionally, the computing device 200 includes an interest module 103 which is communicatively coupled to the bus 220 via signal line 249. The components of the computing device 200 are communicatively coupled by a bus 220. In some instances, the computing device 200 can be one of a social network server 101, a user device 115, a topic server 113 and a second server 107.

The processor 202 includes an arithmetic logic unit, a microprocessor, a general purpose controller or some other processor array to perform computations and provide electronic display signals to a display device. The processor 202 is coupled to the bus 220 for communication with the other components via signal line 222. Processor 202 processes data signals and may include various computing architectures including a complex instruction set computer (CISC) architecture, a reduced instruction set computer (RISC) architecture, or an architecture implementing a combination of instruction sets. Although FIG. 2A includes a single processor 202, multiple processors 202 may be included. Other processors, operating systems, sensors, displays and physical configurations are possible.

The memory 204 stores instructions and/or data that may be executed by the processor 202. The memory 204 is coupled to the bus 220 for communication with the other components via signal line 224. The instructions and/or data may include code for performing the techniques described herein. The memory 204 may be a dynamic random access memory (DRAM) device, a static random access memory (SRAM) device, flash memory or some other memory device. In some instances, the memory 204 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 206 transmits and receives data to and from at least one of the user device 115, the second server 107, the topic server 113 and the social network server 101 depending upon where the reputation module 123 may be stored. The communication unit 206 is coupled to the bus 220 via signal line 226. In some instances, the communication unit 206 includes a port for direct physical connection to the network 105 or to another communication channel. For example, the communication unit 206 includes a USB, SD, CAT-5 or similar port for wired communication with the user device 115. In some instances, the communication unit 206 includes a wireless transceiver for exchanging data with the user device 115 or other communication channels using one or more wireless communication methods, including IEEE 802.11, IEEE 802.16, BLUETOOTH® or another suitable wireless communication method.

In some instances, the communication unit 206 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 206 includes a wired port and a wireless transceiver. The communication unit 206 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some instances, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 via signal line 228.

In some instances, the storage device 243 stores one or more of a count of a user's engagement actions in a specific time period (e.g., a day, a week, etc.), a topical reputation score per topic per user, one or more management actions performed by a user that has an unlocked topic, one or more unlocked topics for a user, a set of impact scores used to adjust a topical reputation score, a reputation threshold, identification data describing one or more other users that engage in a user's unlocked topic (e.g., a user's followers), one or more content sources for an unlocked topic, a whitelist of topics, an interest profile for a user and an interest-based stream for a user, etc. The data stored in the storage device 243 is further described below. In some instances, the storage device 243 may store other data for providing the functionality described herein.

Figure 2B:
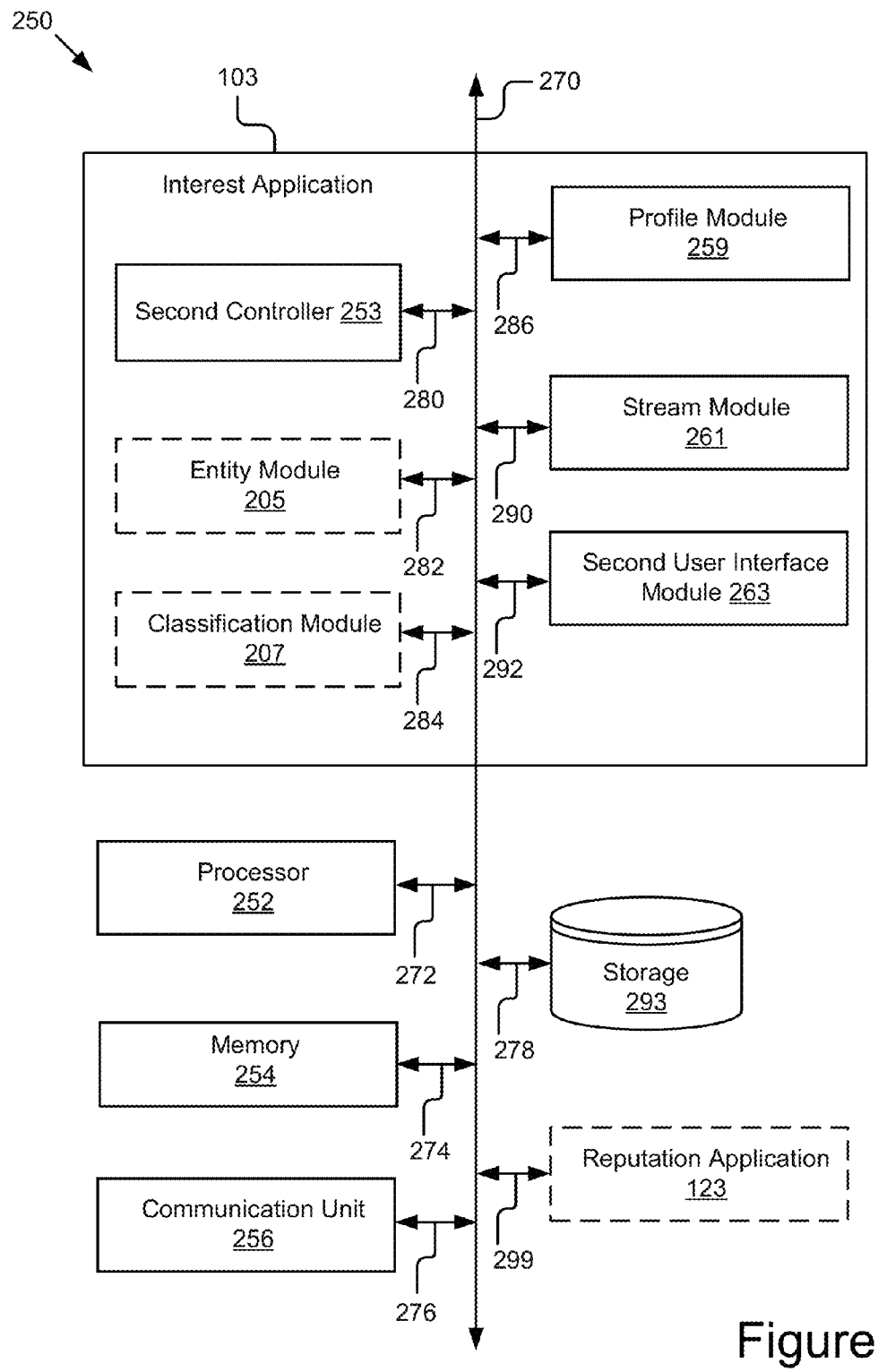
FIG. 2B is a block diagram illustrating an example of an interest module.

In the illustrated implementation shown in FIG. 2A, the reputation module 123 includes a first controller 203, an entity module 205, a classification module 207, a reputation score module 209, an unlocking module 211, a filtering module 213, a management module 215, a presentation module 217 and a first user interface module 219. These components of the reputation module 123 are communicatively coupled to each other via the bus 220. The entity module 205 and the classification module 207 are depicted using dashed lines to indicate that in some implementations these modules can be stored in the interest module 103 as illustrated in FIG. 2B.

The first controller 203 can be software including routines for handling communications between the reputation module 123 and other components of the computing device 200. In some instances, the first controller 203 can be a set of instructions executable by the processor 202 to provide the functionality described below for handling communications between the reputation module 123 and other components of the computing device 200. In some instances, the first controller 203 can be stored in the memory 204 of the computing device 200 and can be accessible and executable by the processor 202. The first controller 203 may be adapted for cooperation and communication with the processor 202 and other components of the computing device 200 via signal line 230.

The first controller 203 sends and receives data, via the communication unit 206, to and from one or more of a user device 115, a topic server 113, a social network server 101 and a second server 107. For example, the first controller 203 receives, via the communication unit 206, data describing an engagement action performed by a user from a user device 115 and sends the data to the entity module 205. In another example, the first controller 203 receives graphical data for providing a user interface to a user from the first user interface module 219 and sends the graphical data to a user device 115, causing the user device 115 to present the user interface to the user.

In some instances, the first controller 203 receives data from other components of the reputation module 123 and stores the data in the storage device 243. For example, the first controller 203 receives data describing a topical reputation score from the reputation score module 209 and stores the data in the storage device 243. In some instances, the first controller 203 retrieves data from the storage device 243 and sends the data to other components of the reputation module 123. For example, the first controller 203 retrieves data describing one or more followers of a user from the storage device 243 and sends the data to the presentation module 217 for presenting content items related to a topic to the one or more followers.

The entity module 205 can be software including routines for determining one or more topics in a content item. In some instances, the entity module 205 can be a set of instructions executable by the processor 202 to provide the functionality described below for determining one or more topics in a content item. In some instances, the entity module 205 can be stored in the memory 204 of the computing device 200 and can be accessible and executable by the processor 202. The entity module 205 may be adapted for cooperation and communication with the processor 202 and other components of the computing device 200 via signal line 232.

Example content items include, but are not limited to, a uniform resource locator (URL), a video, a picture, an audio file, an article, a book, a product, a video game, a post in a social network, an acknowledgement, a comment, etc. Example topics in a content item include, but are not limited to, a topic describing book reading, one or more granular topics describing novel reading and science fiction reading, a topic describing video games and a granular topic describing a specific video game, etc.

In some implementations, a user provides one or more topics for a content item to the entity module 205, causing the entity module 205 to label the content item using the one or more topics. For example, a user identifies one or more topics for a content item when performing an engagement action on the content item and associates the engagement action with the one or more identified topics.

In some implementations, the entity module 205 receives data describing an engagement action associated with a content item performed by a user in a social network. The entity module 205 obtains content included in the content item and identifies one or more topics describing the content. For example, the entity module 205 receives data describing that a user has shared a URL in a social network, and identifies one or more key terms describing subjects included in the content item. Examples of an engagement action include, but are not limited to, commenting on a content item, acknowledging a content item, sharing or resharing a content item, selecting an emoting icon associated with a content item and marking a content item as a favorite item, etc. An emoting icon can be an icon that a user uses to express sentiment reactions to a content item. For example, an emoting icon can be "smile," "frown," "cry" and "laugh," etc. In some implementations, the entity module 205 includes a headless browser to obtain content included in the content item and identifies one or more topics describing the content.

In some implementations, the entity module 205 stores the content item and the one or more identified topics in the storage 243. In some other implementations, the entity module 205 sends the content item and the one or more identified topics to one or more of the classification module 207 and the reputation score module 209.

The classification module 207 can be software including routines for classifying a content item into one or more categories. In some instances, the classification module 207 can be a set of instructions executable by the processor 202 to provide the functionality described below for classifying a content item into one or more categories. In some instances, the classification module 207 can be stored in the memory 204 of the computing device 200 and can be accessible and executable by the processor 202. The classification module 207 may be adapted for cooperation and communication with the processor 202 and other components of the computing device 200 via signal line 234.

The classification module 207 receives one or more identified topics associated with a content item from the entity module 205. In some implementations, the classification module 207 categorizes the content item into one or more categories each related to an identified topic. For example, the classification module 207 creates an association between the content item and a category related to an identified topic, and stores the association in the storage 243. In some other implementations, the classification module 207 classifies the content item to one or more categories each related to a whitelist topic using the one or more identified topics. For example, if an identified topic describes a recently released novel, the classification module 207 categorizes the content item to a whitelist topic that describes a collection of modern novels based on the identified topic. In yet some other implementations, the classification module 207 updates the whitelist topics by adding the one or more identified topics as additional whitelist topics and classifies the content item to one or more categories each related to one of the additional whitelist topics.

A whitelist topic can be an approved topic. For example, a whitelist topic may be a topic approved by an administrator of the computing device 200. In another example, a whitelist topic can be an unlocked topic. An unlocked topic for a user can be a topic published in the user's public profile. For example, an unlocked topic can be a topic customized for the user that other users can engage in (e.g., a topic that other users can follow). In some implementations, an unlocked topic for a user can be a topic that the user has administrative rights to manage. For example, a user can approve or reject an inclusion of other users' sharings in his or her unlocked topic. In some implementations, a user having an unlocked topic can be considered as a reputable contributor to the unlocked topic and has administrative rights to perform management actions on the unlocked topic while other users cannot perform management actions on the unlocked topic. The management of an unlocked topic is described below in more detail.

The reputation score module 209 can be software including routines for determining a topical reputation score related to a topic for a user. In some instances, the reputation score module 209 can be a set of instructions executable by the processor 202 to provide the functionality described below for determining a topical reputation score related to a topic for a user. In some instances, the reputation score module 209 can be stored in the memory 204 of the computing device 200 and can be accessible and executable by the processor 202. The reputation score module 209 may be adapted for cooperation and communication with the processor 202 and other components of the computing device 200 via signal line 236.

A topical reputation score can be data indicating a reputation of a topic with content provided by a user. For example, for the same topic provided by a first user and a second user, if a first topical reputation score associated with the first user can be greater than a second topical reputation score associated with the second user, content provided by the first user may have better quality than that provided by the second user.

In some implementations, the reputation score module 209 receives a topic related to a content item from the entity module 205. The content item has a first engagement action performed by a first user. The reputation score module 209 determines other users' engagement actions associated with the first engagement action and generates a topical reputation score related to the topic for the first user based on the other users' engagement actions. For example, assume a first user shares a URL in a social network. The reputation score module 209 receives a topic related to the URL shared by the first user from the entity module 205. One or more second users in the social network perform one or more engagement actions on the first user's sharing of the URL. Examples of the second users' engagement actions include, but are not limited to, resharing the URL, clicking on the URL, commenting on the URL, replying to the first user's sharing, reposting the first user's sharing, acknowledging the first user's sharing, marking the first user's sharing as a favorite or clicking an emoting icon on the first user's sharing, etc. The reputation score module 209 determines a count of the second users' engagement actions, and generates a topical reputation score for the topic related to the first user's sharing based on the count of the second users' engagement actions.

In some implementations, the reputation score module 209 receives, from the management module 215, data describing a management action performed by a second user on the first user's engagement action. For example, the second user can approve and add the first user's sharing of a URL to the second user's unlocked topic. In another example, the second user can reject the first user's sharing of the URL in the second user's unlocked topic. The second user's unlocked topic may be identified as similar to or the same as the topic associated with the first user's engagement action. A management action can be an operation for managing an unlocked topic. For example, a management action performed by the second user can be one of approving the first user's engagement action in the second user's unlocked topic, adding the first user's engagement action to the unlocked topic, recommending the first user's engagement action to other users in a topic page of the unlocked topic, advertising the first user's engagement action in the topic page of the unlocked topic, rejecting to include the first user's engagement action in the unlocked topic or removing the first user's engagement action from the unlocked topic, etc. A topic page can be a page where content included in a topic can be published.

The second user's management action may have a positive or negative impact on the first user's engagement action. This positive or negative impact may be described by an impact score. For example, a positive impact on the first user's engagement action can be described by a positive impact score; a negative impact on the first user's engagement action can be described by a negative impact score. For example, an approval management action to include the first user's engagement action in the second user's unlocked topic generates a positive impact score for the first user's engagement action; a rejection management action to reject the first user's engagement action in the second user's unlocked topic generates a negative impact score for the first user's engagement action.

In some implementations, the reputation score module 209 determines a set of impact scores for the first user's engagement action based on the second user's management action. The set of impacts scores forms a chain of impact scores indicating a chain of impacts on the first user's engagement action. For example, if the second user's management action describes that the second user approves the inclusion of the first user's sharing of a URL in the second user's unlocked topic, the reputation score module 209 generates a first impact score caused by the second user's management action. If a third user has commented on the second user's management action (e.g., the third user has commented on the second user's approval of the first user's sharing in the second user's topic page), the reputation score module 209 generates a second impact score caused by the third user's comment on the second user's topic page. If a fourth user has shared the third user's comment, the reputation score module 209 generates a third impact score caused by the fourth user's sharing of the comment. The first impact score, the second impact score and the third impact score form a chain of impact scores for the first user's engagement action. An example illustrating a chain of impact scores is illustrated with reference to FIG. 16.

In some implementations, the set of impact scores includes a time-evolving modeling of the impact scores. For example, the set of impact scores includes a first impact score associated with the second user's management action and a second impact score associated with a third user's engagement action established upon the second user's management action. The set of impact scores including the first and second impact scores can be changed over time, because more and more other users can engage in the second user's management action (e.g., the second user's approval or rejection of the first user's sharing) and the third user's engagement action in future. In some implementations, the set of impact scores includes a time-evolving modeling of the chain of impact scores.

An impact score may promote or demote a topical reputation score of a topic. For example, a positive impact score associated with an approval management action to include the first user's engagement action in an unlocked topic can promote the topical reputation score, and a negative impact score associated with a rejection management action to reject the first user's engagement action in an unlocked topic can demote the topical reputation score. In some implementations, the reputation score module 209 adjusts the topical reputation score related to the topic based on the set of impact scores. For example, the reputation score module 209 adjusts the topical reputation score based on a weighted sum of the set of impact scores. In some implementations, a first user shares a content item. The reputation module 123 determines a topic for the content item and determines a corresponding increase in the first user's topical reputation score. A second user takes an engagement action to share the same content item that was shared by the first user. The second user gets a weighted increase in their topical reputation score. For example, the second user gets less of an increase in their topical reputation score relative to the first user because the second user simply re-shared a content item that was initially shared by the first user. In this way the reputation module 123 encourages users to take engagement actions that involve providing new content items to the reputation module 123. In some implementations, the weighted score assigned to the second user is based in part on a time-evolving modeling of the chain of impact scores as described above in the previous paragraph.

In some implementations, the first user has various engagement actions related to the same topic (e.g., various sharings of the same topic). The reputation score module 209 updates the topical reputation score for the topic based on each of the first user's engagement action. For example, the reputation score module 209 updates the topical reputation score for the topic each time the first user shares a content item related to the topic. The reputation score module 209 also adjusts the topical reputation score based on each set of impact scores related to each sharing of content items.

In some implementations, the reputation score module 209 stores data describing the topical reputation score in the storage 243. In some implementations, the reputation score module 209 sends data describing the topical reputation score to the unlocking module 211.

The unlocking module 211 can be software including routines for unlocking a topic for a user. In some instances, the unlocking module 211 can be a set of instructions executable by the processor 202 to provide the functionality described below for unlocking a topic for a user. In some instances, the unlocking module 211 can be stored in the memory 204 of the computing device 200 and can be accessible and executable by the processor 202. The unlocking module 211 may be adapted for cooperation and communication with the processor 202 and other components of the computing device 200 via signal line 238.

In some implementations, the unlocking module 211 receives data describing a topical reputation score related to a topic of a user's engagement action (e.g., a user's sharing of a URL). The unlocking module 211 determines whether the topical reputation score satisfies a reputation threshold. For example, the unlocking module 211 determines whether a topical reputation score is equal to or greater than a reputation threshold. The reputation threshold can be configured by an administrator of the computing device 200 or determined by the unlocking module 211 using heuristic techniques. If the topical reputation score is equal to or greater than the reputation threshold, the unlocking module 211 unlocks the topic for the user. In some implementations, the unlocking of a topic allows the user to curate content items associated with the unlocked topic. For example, the user can publish the topic in his or her public profile, provides administrative rights to the user for managing content included in the unlocked topic and allows other users to engage in the user's unlocked topic. For example, if another user may be interested in the user's unlocked topic, the other user can merely follow the user's unlocked topic and receive a feed including content associated with the unlocked topic rather than receiving all the content published by the user. In some implementations, providing a user the ability to curate content items for a topic includes giving the user the ability to control how content items appear in the feed and where the content items are ranked in the feed. In some implementations, the content items that are curated by a first user are submitted by one or more second users. In some implementations, the curating content items includes the reputation module 123 providing the user with a content items and the user providing an input to the reputation module 123 that indicates whether the content item should be associated with a topic. In some implementations, the reputation module 123 generates a graphical user interface (e.g., a widget) that the user uses to curate the content items.

In some implementations, the user can select to publish the unlocked topic in the public profile or not. If the user selects to publish the unlocked topic, the unlocking module 211 adds the unlocked topic in the user's public profile. For example, the unlocking module 211 adds the unlocked topic as a badge or an achievement in the user's topic page. Otherwise, the unlocking module 211 adds the unlocked topic to the user's private profile and does not publish the unlocked topic in the user's public profile.

In some implementations, the unlocking module 211 stores data describing the unlocked topic in the storage 243. In some implementations, the unlocking module 211 sends data describing the unlocked topic to one or more of the filtering module 213, the management module 215 and the presentation module 217.

The filtering module 213 can be software including routines for filtering content based on an unlocked topic. In some instances, the filtering module 213 can be a set of instructions executable by the processor 202 to provide the functionality described below for filtering content based on an unlocked topic. In some instances, the filtering module 213 can be stored in the memory 204 of the computing device 200 and can be accessible and executable by the processor 202. The filtering module 213 may be adapted for cooperation and communication with the processor 202 and other components of the computing device 200 via signal line 240.

In some implementations, the filtering module 213 receives data describing that a second user has engaged in a first user's unlocked topic. For example, the second user has followed or favorited the first user's unlocked topic. The filtering module 213 retrieves data describing a set of content items published by the first user from the storage 243 and filters the set of content items using the first user's unlocked topic. For example, the filtering module 213 generates a filtered result that includes one or more content items related to the unlocked topic from the set of content items. The filtering module 213 sends the filtered result to the presentation module 217, causing the presentation module 217 to present the filtered result to the second user. In some implementations, the filtering module 213 stores the filtered result in the storage 243.

The management module 215 can be software including routines for managing an unlocked topic. In some instances, the management module 215 can be a set of instructions executable by the processor 202 to provide the functionality described below for managing an unlocked topic. In some instances, the management module 215 can be stored in the memory 204 of the computing device 200 and can be accessible and executable by the processor 202. The management module 215 may be adapted for cooperation and communication with the processor 202 and other components of the computing device 200 via signal line 242.

In some implementations, the management module 215 receives data describing an unlocked topic for a first user from the unlocking module 211. The management module 215 grants administrative rights to the first user, allowing the first user to perform one or more management actions on the unlocked topic. For example, the management module 215 instructs the first user interface module 219 to generate graphical data for providing a user interface to the first user, allowing the first user to manage content items included in the unlocked topic via the user interface. In another example, the first user manages subscription of the unlocked topic from other users that have engaged in the unlocked topic (e.g., followers of the unlocked topic) via the user interface.

In some instances, the first user approves or rejects the inclusion of an engagement action from a second user (e.g., the second user's sharing of a content item) in the first user's unlocked topic. The first user's management action on the second user's engagement action describes an acknowledgement of relevance between the second user's engagement action and the unlocked topic. For example, if the second user's engagement action can be relevant to the unlocked topic, the first user may include the second user's engagement action in the unlocked topic; if the second user's engagement action can be irrelevant to the unlocked topic, the first user may reject to include the second user's engagement action in the unlocked topic. The first user's management action has an impact on a topical reputation score related to the second user's engagement action as described above.

In some instances, the first user adds a content source or additional content items in the unlocked topic. The management module 215 instructs the first user interface module 219 to generate graphical data for providing a user interface to the first user, allowing the first user to add a content source or additional content items to the unlocked topic via the user interface. A content source can be a source that provides content to a topic. For example, a content source can be a RSS feed or a social network account that provides content items to an unlocked topic.

In some implementations, the management module 215 sends management data describing the first user's management action related to the second user's engagement action to one or more of the reputation score module 209 and the presentation module 217. In some other implementations, the management module 215 stores the management data in the storage 243.

The presentation module 217 can be software including routines for presenting data to users. In some instances, the presentation module 217 can be a set of instructions executable by the processor 202 to provide the functionality described below for presenting data to users. In some instances, the presentation module 217 can be stored in the memory 204 of the computing device 200 and can be accessible and executable by the processor 202. The presentation module 217 may be adapted for cooperation and communication with the processor 202 and other components of the computing device 200 via signal line 244.

In some implementations, the presentation module 217 presents a count of a user's engagement actions to the user. For example, the presentation module 217 presents a count of the user's sharings performed in a day, a week or a month to the user. In some implementations, the presentation module 217 receives an unlocked topic associated with a user form the unlocking module 211 and presents the unlocked topic to the user. In some implementations, the presentation module 217 receives a filtered result for a first user that engages in a second user's unlocked topic from the filtering module 213 and presents the filtered result to the first user. In some implementations, the presentation module 217 updates content items included in an unlocked topic based on one or more management actions associated with the unlocked topic and presents the updated content items to users that engage in the unlocked topic. In some other implementations, the presentation module 217 may present other data to users.

The first user interface module 219 can be software including routines for generating graphical data for providing user interfaces to users. In some instances, the first user interface module 219 can be a set of instructions executable by the processor 202 to provide the functionality described below for generating graphical data for providing user interfaces to users. In some instances, the first user interface module 219 can be stored in the memory 204 of the computing device 200 and can be accessible and executable by the processor 202. The first user interface module 219 may be adapted for cooperation and communication with the processor 202 and other components of the computing device 200 via signal line 246.

In some instances, the first user interface module 219 generates graphical data for providing a user interface that presents an option for a user to publish an unlocked topic. The first user interface module 219 sends the graphical data to a user device 115 operated by the user, causing the user device 115 to present the option to the user via the user interface. In some instances, the first user interface module 219 generates graphical data for providing a user interface that allows a user to manage content items included in an unlocked topic. In some instances, the first user interface module 219 generates graphical data for providing a user interface that allows a user to add content sources or additional content items to an unlocked topic. Example user interfaces are shown in FIGS. 7-15. The first user interface module 219 may generate graphical data for providing other user interfaces to users.

An example use of the reputation module 123 can be illustrated below. Assume a user Robert shares various content items associated with a topic "start-up" in one or more social networks. The entity module 205 determines one or more topics (including the start-up topic) associated with the content items. The classification module 207 classifies the content items into one or more categories each related to a determined topic. The one or more categories include a category related to the start-up topic. For each content item shared in each social network, the reputation score module 209 determines a set of engagement actions performed by a first set of other users. The reputation score module 209 generates a topical reputation score related to the start-up topic for Robert based on each set of engagement actions related to each sharing of a content item. The reputation score module 209 adjusts the topical reputation score based on a set of management actions performed by a second set of other users. The second set of other users manages at least one of Robert's sharings in their unlocked topic. The unlocked topic of the second set of other users can be identified as similar to or the same as the start-up topic.

The unlocking module 211 determines whether the topical reputation score associated with the topic is equal to or greater than a reputation threshold. If the topical reputation score is equal to or greater than the reputation threshold, the unlocking module 211 unlocks the topic for Robert and provides administrative rights to Robert for managing the unlocked topic. Upon the publication of the unlocked topic in Robert's public profile, other users can follow the start-up topic from Robert and receive content items shared by Robert under the unlocked topic. Robert can manage the content items included in his unlocked topic and his management actions can generate an impact on other users' engagement actions. For example, if an article labeled as "start-up" and shared by Alice may be irrelevant to the start-up topic, Robert rejects to include in his unlocked topic the shared item from Alice. Robert's rejection management action has a negative impact on a topical reputation score related to Alice's start-up topic. In another example, if a video labeled as "start-up" and shared by Bob may be relevant to the start-up topic, Robert approves to include in his unlocked topic the shared item from Bob. Robert's approval management action has a positive impact on a topical reputation score related to Bob's start-up topic. In some implementations, Robert can also perform various management actions on his unlocked topic, e.g., adding a content source, adding content items to the unlocked topic, editing topics included in his public profile or topic page, etc.

Referring now to FIG. 2B, an example of the interest module 103 is shown in more detail. FIG. 2B is a block diagram of a computing device 250 that includes an interest module 103, a processor 252, a memory 254, a communication unit 256 and a storage device 293 according to some examples. Optionally, the computing device 250 includes a reputation module 123. The components of the computing device 250 are communicatively coupled by a bus 270. In some instances, the computing device 250 can be one of a social network server 101, a user device 115, a topic server 113 and a second server 107.

The reputation module 123 is communicatively coupled to the bus 270 via signal line 299. The processor 252 is communicatively coupled to the bus 270 via signal line 272. The memory 254 is communicatively coupled to the bus 270 via signal line 274. The communication unit 256 is communicatively coupled to the bus 270 via signal line 276. The storage 293 is communicatively coupled to the bus 270 via signal line 278. The processor 252, the memory 254, the communication unit 256 and the storage device 293 have similar structure and provide similar functionality as the processor 202, the memory 204, the communication unit 206 and the storage 243 respectively. The description will not be repeated here.

In the illustrated implementation, the interest module 103 includes a second controller 253, a profile module 259, a stream module 261 and a second user interface module 263. Optionally, the interest module 103 includes an entity module 205 and a classification module 207. The entity module 205 and the classification module 207 are described above with reference to FIG. 2A, and the description will not be repeated here. The entity module 205 is communicatively coupled to the bus 270 via signal line 282. The classification module 207 is communicatively coupled to the bus 270 via signal line 284.

The second controller 253 can be software including routines for handling communications between the interest module 103 and other components of the computing device 250. In some instances, the second controller 253 can be a set of instructions executable by the processor 252 to provide the functionality described below for handling communications between the interest module 103 and other components of the computing device 250. In some instances, the second controller 253 can be stored in the memory 254 of the computing device 250 and can be accessible and executable by the processor 252. The second controller 253 may be adapted for cooperation and communication with the processor 252 and other components of the computing device 250 via signal line 280.

The second controller 253 sends and receives data, via the communication unit 256, to and from one or more of a user device 115, a topic server 113, a social network server 101 and a second server 107. For example, the second controller 253 receives, via the communication unit 256, data describing an engagement action performed by a user from a user device 115 and sends the data to the entity module 205. In another example, the second controller 253 receives graphical data for providing a user interface to a user from the second user interface module 263 and sends the graphical data to a user device 115, causing the user device 115 to present the user interface to the user.

In some instances, the second controller 253 receives data from components of the interest module 103 and stores the data in the storage device 293. In some instances, the second controller 253 retrieves data from the storage device 293 and sends the data to components of the interest module 103. In some instances, the second controller 253 may handle communication between components of the interest module 103.

The profile module 259 can be software including routines for managing an interest profile associated with a user. In some instances, the profile module 259 can be a set of instructions executable by the processor 252 to provide the functionality described below for managing an interest profile associated with a user. In some instances, the profile module 259 can be stored in the memory 254 of the computing device 250 and can be accessible and executable by the processor 252. The profile module 259 may be adapted for cooperation and communication with the processor 252 and other components of the computing device 250 via signal line 286.

An interest profile associated with a user can be data describing one or more interests of the user. For example, an interest profile can be data describing one or more topics that a user marks as favorite topics. In some implementations, a user provides an input including one or more interests, hobbies and favorite topics, etc., to the profile module 259. The profile module 259 generates an interest profile for the user based on the user input.

In some implementations, the profile module 259 determines one or more engagement actions performed by a user, where the one or more engagement actions relate to a topic. The profile module 259 determines an interest score associated with the topic for the user based on the one or more engagement actions. An interest score associated with a topic can be data indicating a user's interest on the topic. The profile module 259 determines whether the interest score associated with the topic is equal to or greater than a score threshold. The score threshold can be configured by an administrator of the computing device 250 or determined by the profile module 259 using heuristic techniques.

If the interest score related to the topic is equal to or greater than the score threshold, the profile module 259 recommends the topic to the user. For example, the profile module 259 invites the user to follow the topic or mark the topic as a favorite topic if the user has not yet followed or favorited the topic. If the user engages in the topic recommendation, the profile module 259 updates the user's interest profile based on the user's engagement action. For example, if the user marks the topic as a favorite topic or follows the topic, the profile module 259 adds the topic to the user's interest profile.

In some implementations, the profile module 259 refines a topic structure included in the interest profile over time based on engagement actions performed by the user. A topic structure can be data describing a set of topics that may be interested to a user. For example, a topic structure can be a topic hierarchy that includes one or more high-level topics, one or more first granular topics originated from each high-level topic and one or more second granular topics originated from each first granular topic, etc. The topic structure can include various high-level topics and various granular topics. For example, assume a user marks music as a favorite topic when the user initially joins a social network. The profile module 259 generates an interest profile having a topic structure that includes a first topic "music" for the user. The stream module 261 generates and presents an interest-based stream to the user that includes a first post related to rock music and a second post related to pop music. The user marks the first post related to rock music as a favorite post. The profile module 259 refines the topic structure in the interest profile based on the user's engagement action so that rock music can be included as a granular topic under the music topic in the topic structure. In this example, the topic structure includes a first tier topic "music" and a second tier topic "rock music." The second tier topic can be more refined than the first tier topic. In other examples, the topic structure has various tiers of topics in addition to the first tier topic and the second tier topic, for example, a third tier topic of rock music from a specific band and a fourth tier topic of rock music from a key member in the specific band, etc.

In some implementations, the profile module 259 stores data describing the interest profile in the storage 293. In some implementations, the profile module 259 sends data describing the interest profile to the stream module 261.

The stream module 261 can be software including routines for providing an interest-based stream to a user. In some instances, the stream module 261 can be a set of instructions executable by the processor 252 to provide the functionality described below for providing an interest-based stream to a user. In some instances, the stream module 261 can be stored in the memory 254 of the computing device 250 and can be accessible and executable by the processor 252. The stream module 261 may be adapted for cooperation and communication with the processor 252 and other components of the computing device 250 via signal line 290.

In some implementations, the stream module 261 receives data describing an interest profile associated with a user from the profile module 259. The stream module 261 generates an interest-based stream for the user based on the interest profile. For example, if the interest profile includes a topic describing a band specialized in rock music, the stream module 261 generates an interest-based stream for the user that includes content items related to the band. The stream module 261 sends the interest-based stream to the second user interface module 263, causing the second user interface module 263 to generate graphical data for providing the interest-based stream to the user in a user interface.

The second user interface module 263 can be software including routines for generating graphical data for providing user interfaces to users. In some instances, the second user interface module 263 can be a set of instructions executable by the processor 252 to provide the functionality described below for generating graphical data for providing user interfaces to users. In some instances, the second user interface module 263 can be stored in the memory 254 of the computing device 250 and can be accessible and executable by the processor 252. The second user interface module 263 may be adapted for cooperation and communication with the processor 252 and other components of the computing device 250 via signal line 292.

In some instances, the second user interface module 263 generates graphical data for providing a user interface that provides an interest-based stream to a user. The second user interface module 263 sends the graphical data to a user device 115 operated by the user, causing the user device 115 to present the interest-based stream to the user via the user interface. Example user interfaces are shown in FIGS. 5A-5G. The second user interface module 263 may generate graphical data for providing other user interfaces to users.

Figure 3:
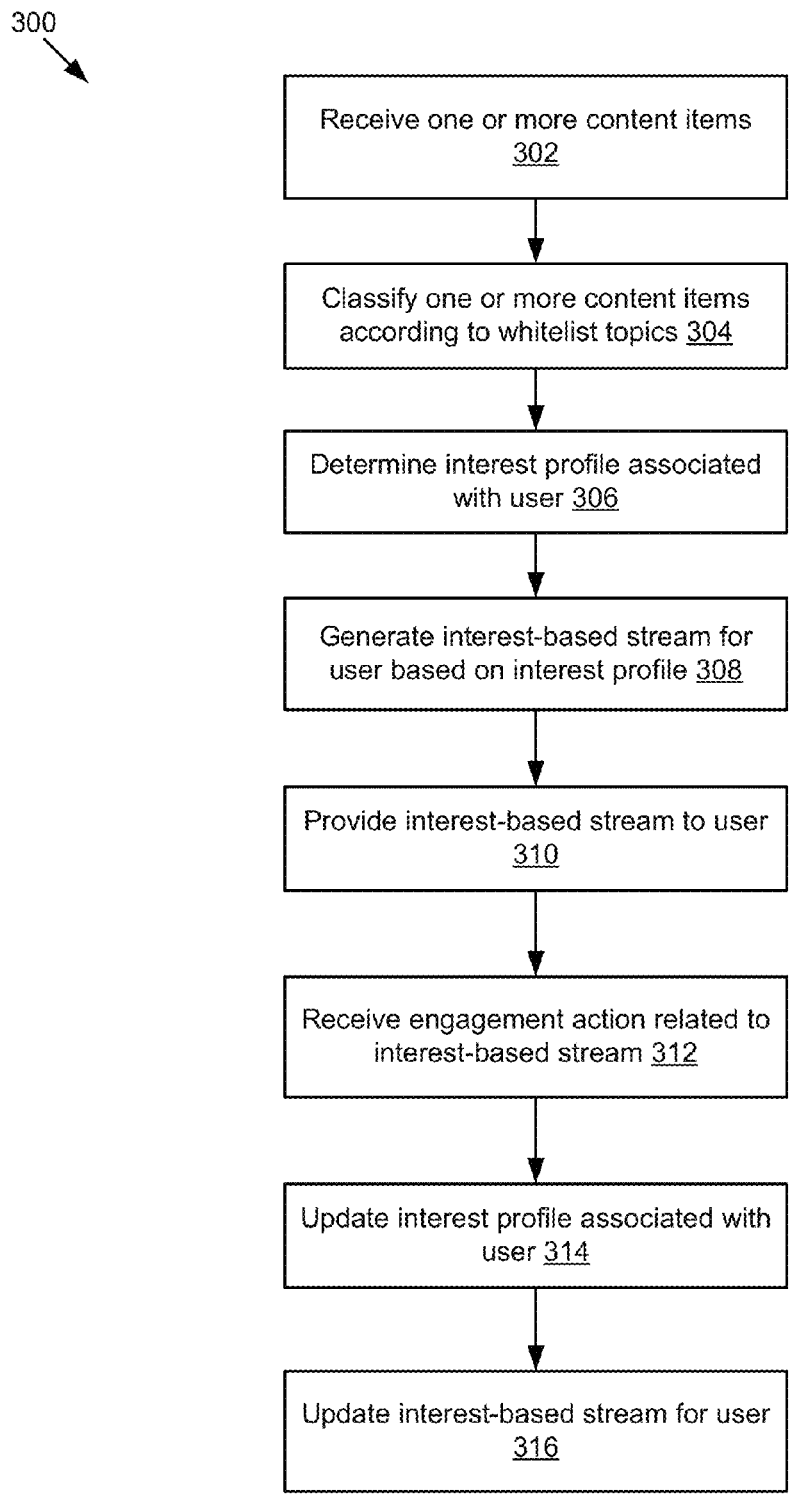
FIG. 3 is a flowchart of an example method for providing an interest-based stream to a user.

FIG. 3 is a flowchart of an example method 300 for providing an interest-based stream to a user. In some instances, the second controller 253 receives 302 one or more content items from one or more content sources. The classification module 207 classifies 304 the one or more content items according to one or more whitelist topics. The profile module 259 determines 306 an interest profile associated with a user. The stream module 261 generates 308 an interest-based stream for the user based on the interest profile. The stream module 261 provides 310 the interest-based stream to the user. The second controller 253 receives 312 data describing an engagement action related to the interest-based stream. The profile module 259 updates 314 the interest profile associated with the user based on the engagement action. The stream module 261 updates 316 the interest-based stream for the user based on the updated interest profile.

Figure 4A:
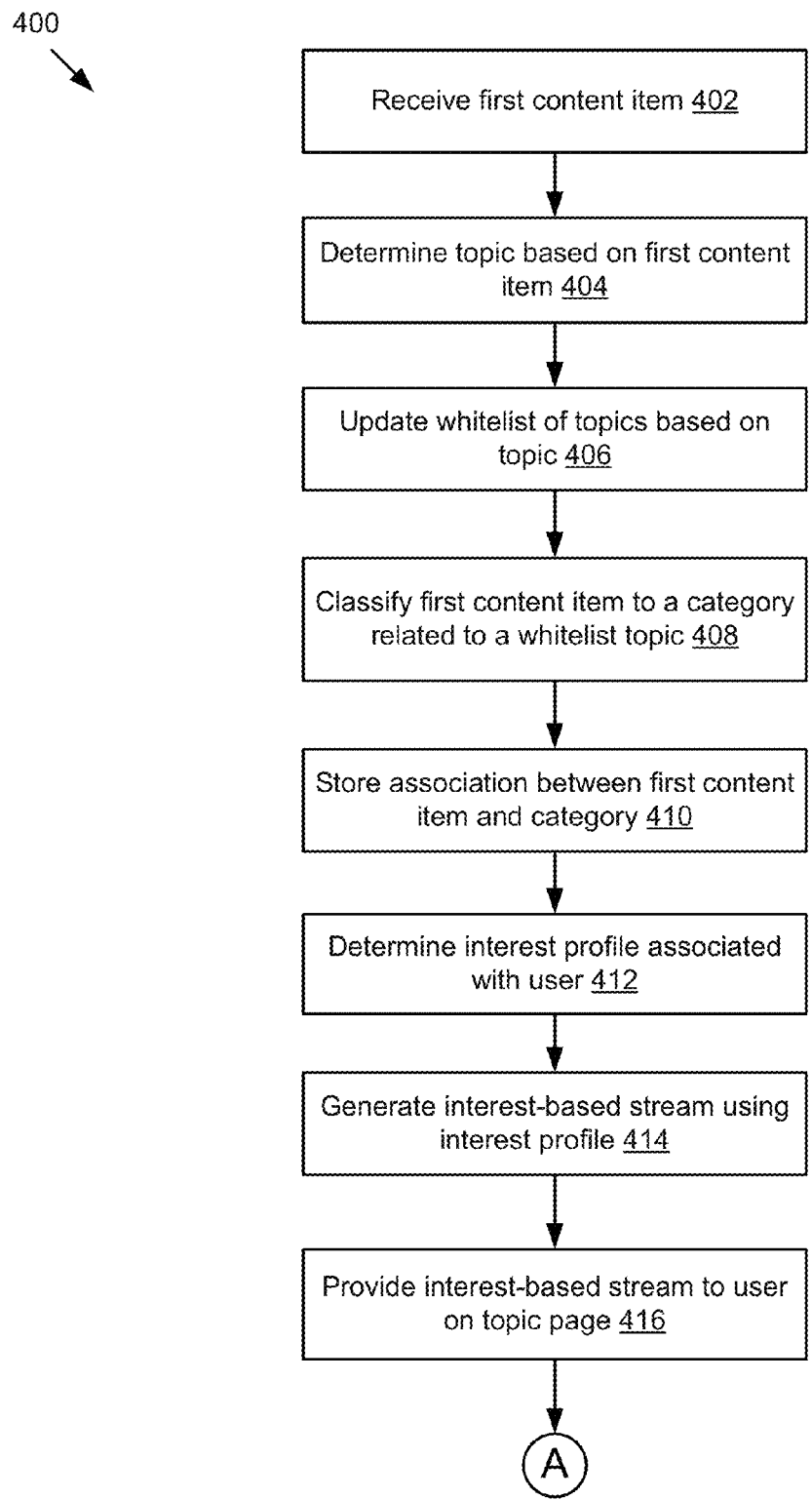
FIGS. 4A-4C are flowcharts of another example method for providing an interest-based stream to a user.
Figure 4B:
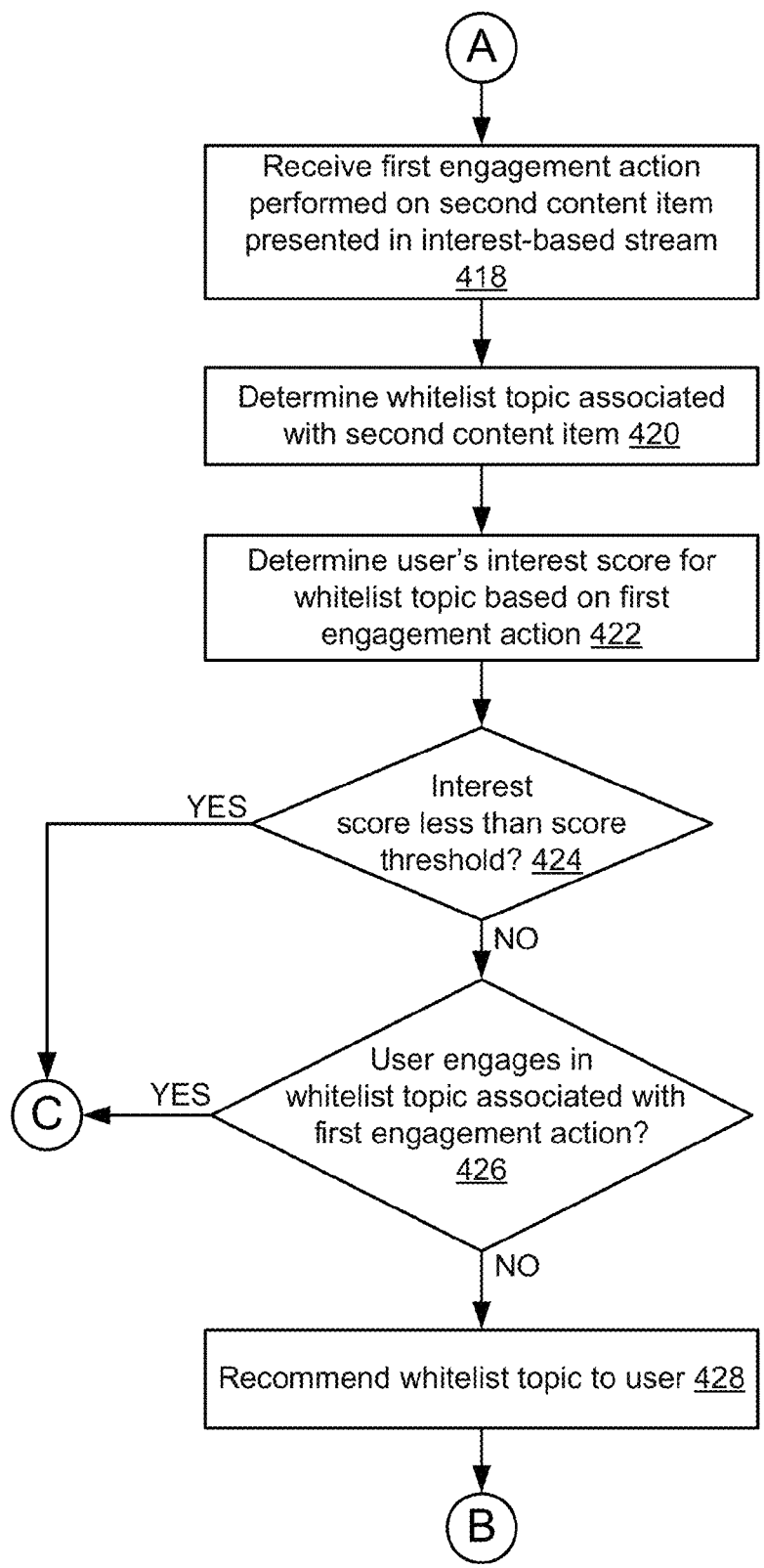
Figure 4C:
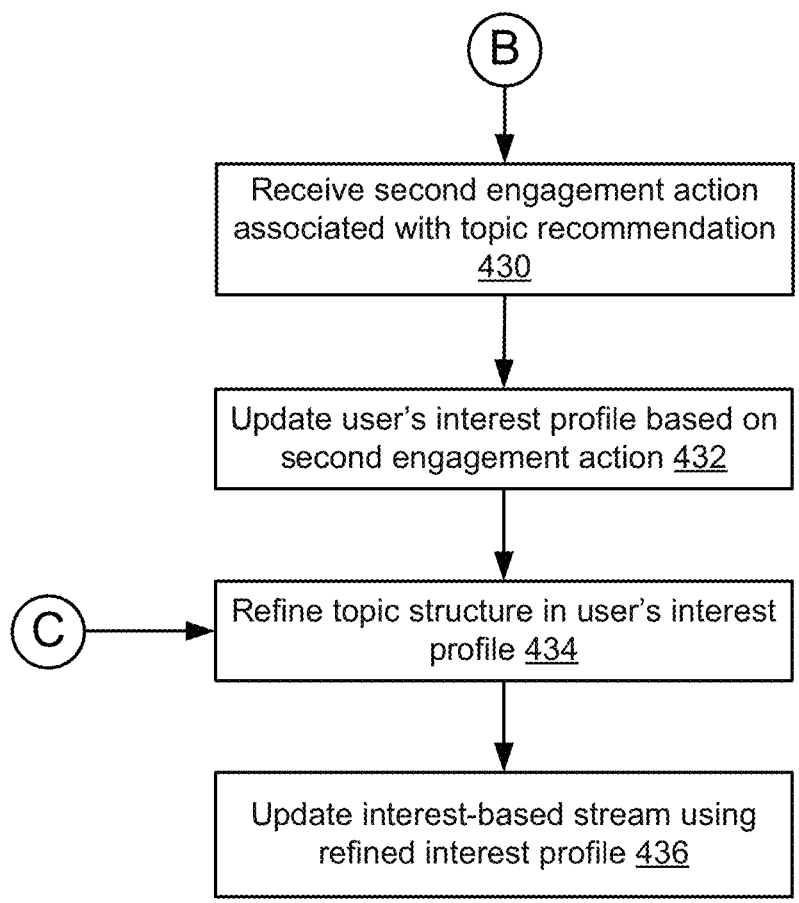

FIGS. 4A-4C are flowcharts of another example method 400 for providing an interest-based stream to a user. Referring to FIG. 4A, the second controller 253 receives 402 a first content item from a content source. The entity module 205 determines 404 a topic based on the first content item. Optionally, the classification module 207 updates 406 a whitelist of topics based on the determined topic. The classification module 207 classifies 408 the first content item to a category related to a whitelist topic. The classification module 207 stores 410 an association between the first content item and the category in the storage 293. The profile module 259 determines 412 an interest profile associated with a user. The stream module 261 generates 414 an interest-based stream for the user using the interest profile. The stream module 261 provides 416 the interest-based stream to the user on a topic page of the user.

Referring to FIG. 4B, the second controller 253 receives 418 data describing a first engagement action performed by the user on a second content item presented in the interest-based stream. The entity module 205 determines 420 a whitelist topic associated with the second content item. The profile module 259 determines 422 an interest score related to the whitelist topic for the user based on the first engagement action. The profile module 259 determines 424 whether the interest score is less than a score threshold. If the interest score is less than the score threshold, the method 400 moves to block 434 depicted in FIG. 4C. Otherwise, the method 400 moves to block 426. At block 426, the method 400 determines whether the user engages in the whitelist topic associated with the first engagement action. For example, the method 400 determines whether the user already follows the whitelist topic or marks the whitelist topic as a favorite topic. If the user already engages in the whitelist topic, the method 400 moves to block 434. Otherwise, the profile module 259 recommends 428 the whitelist topic to the user. For example, the profile module 259 invites the user to follow the whitelist topic or marks the whitelist topic as a favorite topic.

Referring to FIG. 4C, the second controller 253 receives 430 a second engagement action associated with the topic recommendation. For example, the second controller 253 receives an engagement action indicating that the user marks the whitelist topic as a favorite topic. The profile module 259 updates 432 the interest profile associated with the user based on the second engagement action. The profile module 259 refines 434 a topic structure in the interest profile using the second engagement action. The stream module 261 updates 436 the interest-based stream using the refined interest profile and presents the updated stream to the user.

Figure 5A:
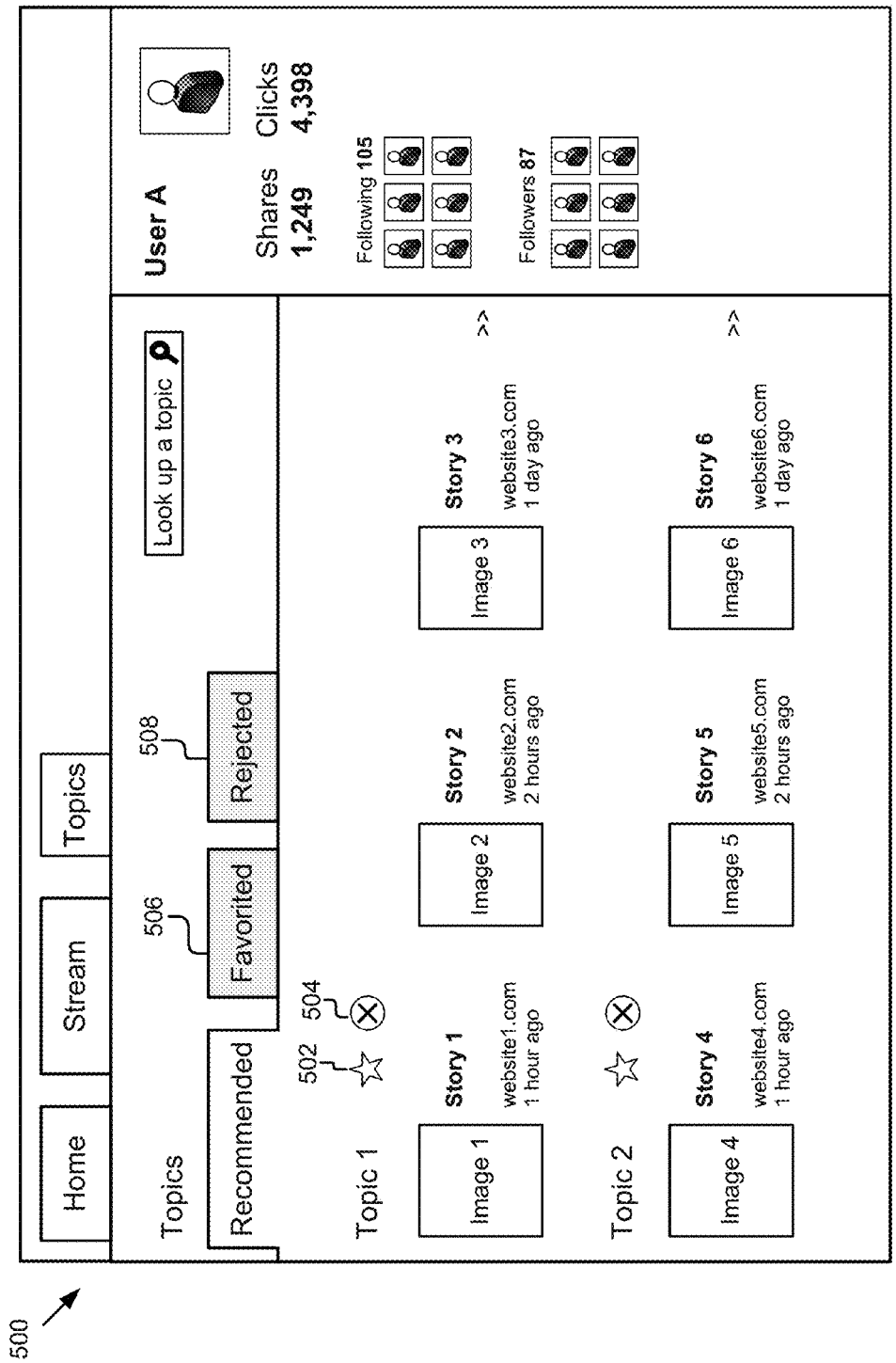
FIG. 5A is a graphic representation of an example user interface for providing a topic page to a user.

FIG. 5A is a graphic representation 500 of an example user interface for providing a topic page to a user. In the example user interface, a user can mark a topic as a favorite topic by clicking on a button 502 or reject a topic by clicking on a button 504. If the user clicks on a menu 506, the example user interface will show topics marked as favorites by the user. If the user clicks on a menu 508, the example user interface will show topics rejected by the user.

Figure 5B:
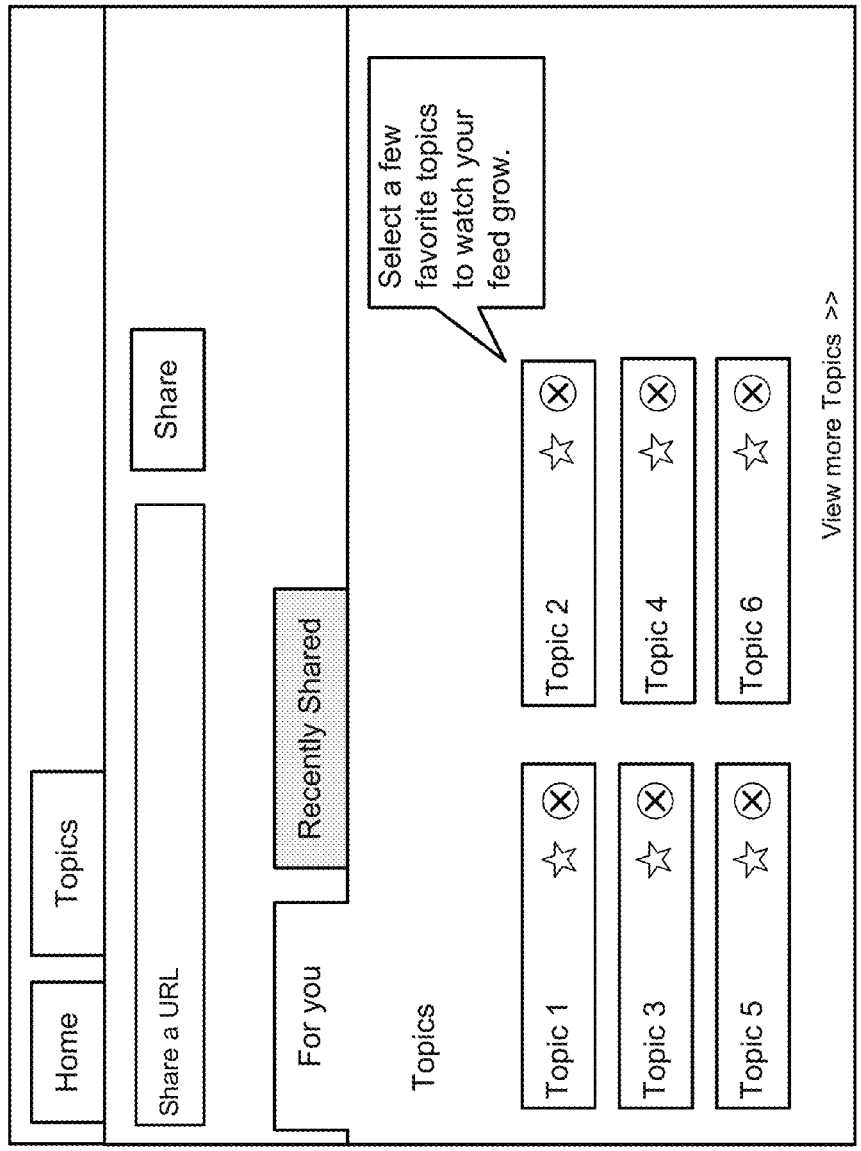

FIGS. 5B and 5C are graphic representations 520, 530 of example user interfaces for establishing an interest profile for a user. The example user interfaces allow a user to select one or more topics as favorite topics. The user can also select one of the emoting icons 532 for a content item or a topic as illustrated in FIG. 5C. The profile module 259 generates an interest profile for the user based on the selected topics and/or the selection of the emoting icons 532.

Figure 5D:
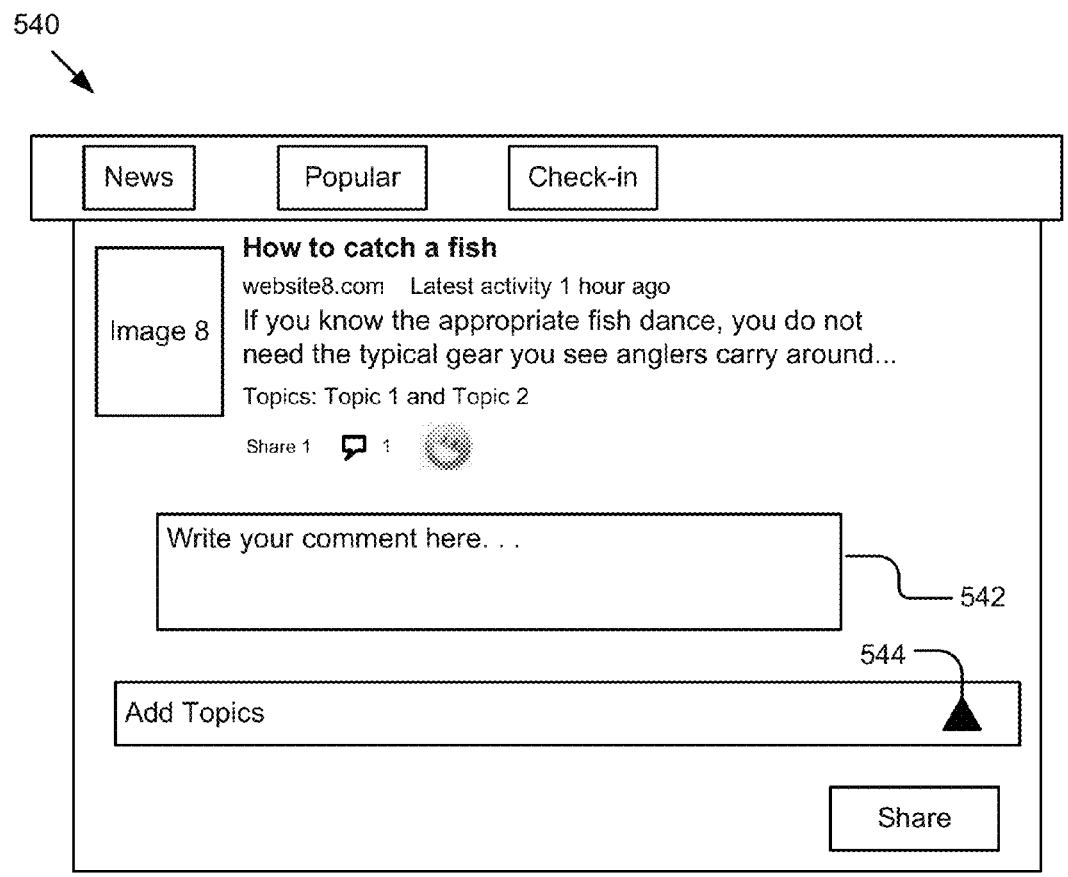
FIGS. 5D-5F are graphic representations of example user interfaces for sharing a content item.
Figure 5E:
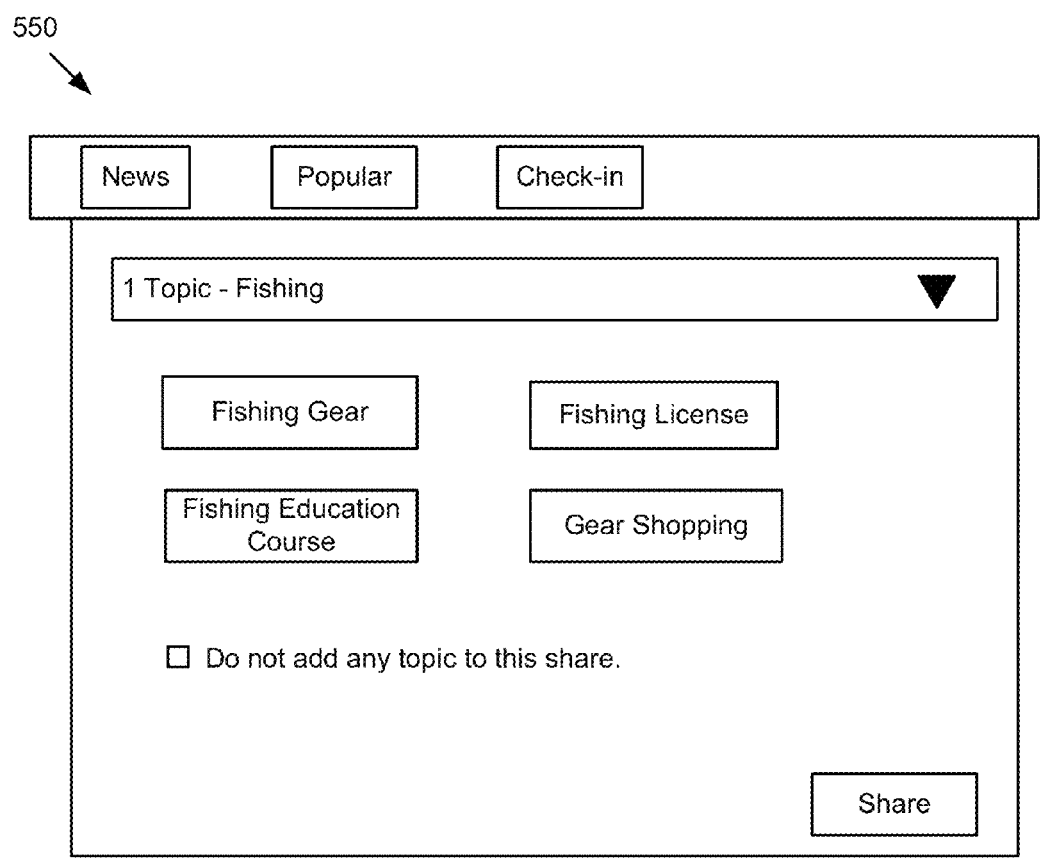
Figure 5F:
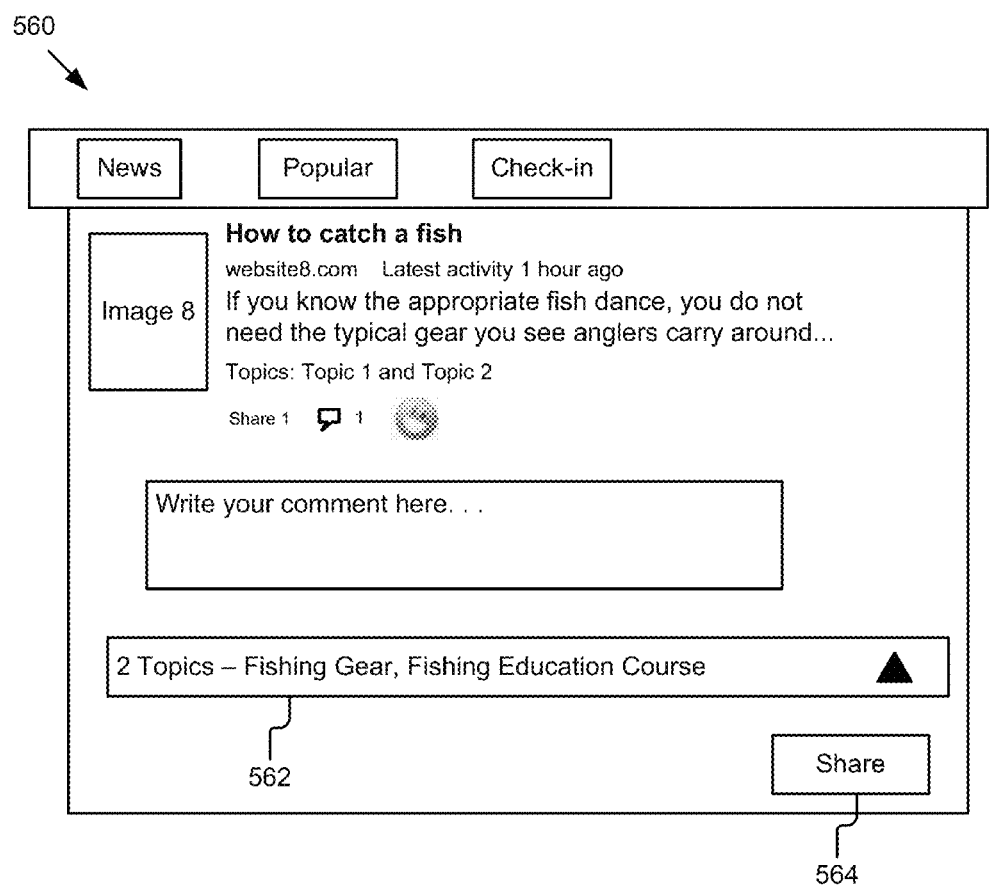

FIGS. 5D-5F are graphic representations 540, 550, 560 of example user interfaces for sharing a content item. Referring to FIG. 5D, a user can comment on a content item via a box 542. If the user clicks on a button 544, the example user interface shown in FIG. 5E will be presented to the user, allowing the user to add one or more topics to the content item. FIG. 5F illustrates one or more topics added by the user in a box 562. The user can click on a share button 564 to share the content item including the one or more added topics with other users.

FIG. 5G is a graphic representation 570 of an example user interface for recommending a topic to a user. The example user interface includes a message 572 that invites the user to mark a topic as a favorite topic.

Figure 6A:
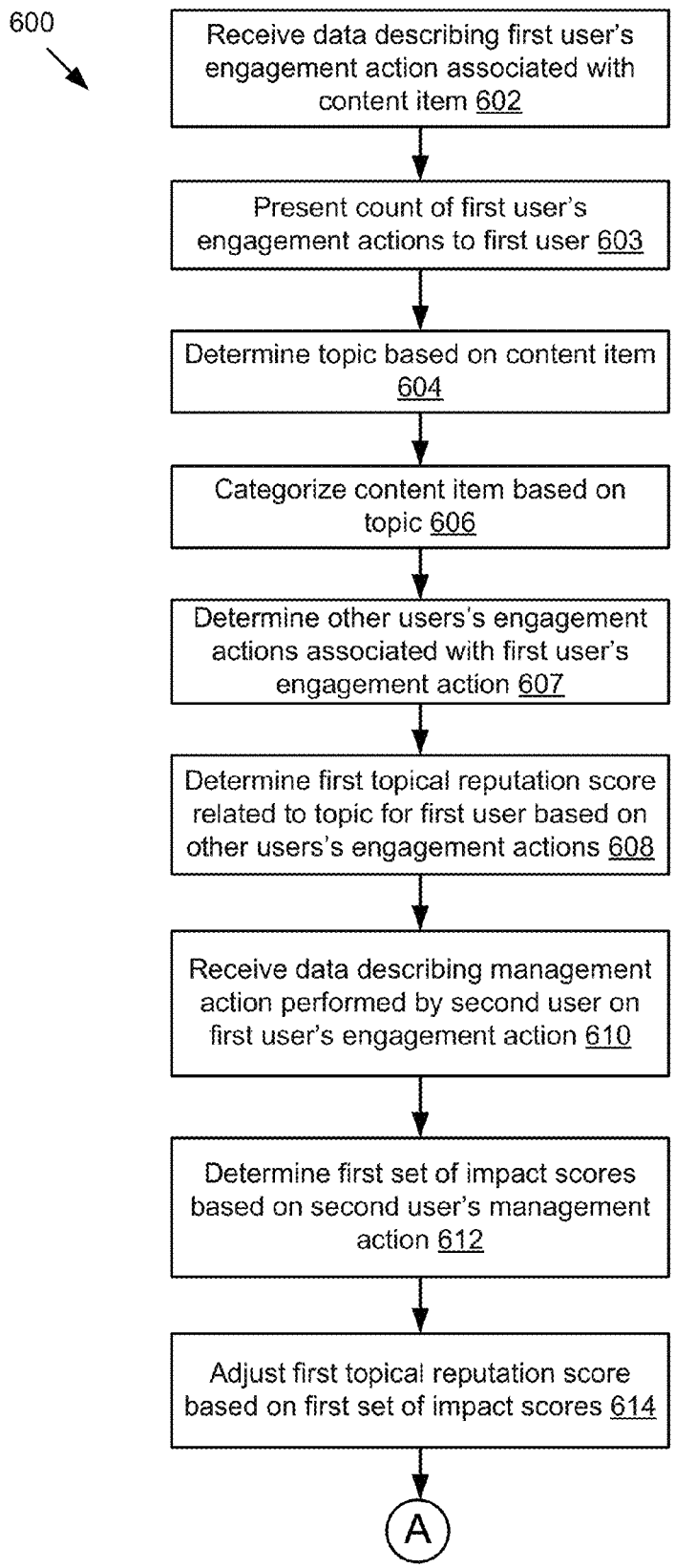
FIGS. 6A-6D are flowcharts of an example method for managing a topical community.

FIGS. 6A-6D are flowcharts of an example method 600 for establishing a topical community. Referring to FIG. 6A, the first controller 203 receives 602 data describing a first user's engagement action associated with a content item. Optionally, the presentation module 217 presents 603 a count of the first user's engagement actions to the first user. In some implementations, the engagement actions of steps 602 and 603 include the engagement actions of a second user. The entity module 205 determines 604 a topic based on the content item. The classification module 207 categorizes 606 the content item based on the topic. The reputation score module 209 determines 607 other users' engagement actions associated with the first user's engagement action. The reputation score module 209 determines 608 a first topical reputation score related to the topic for the first user based on the other users' engagement actions.

In some implementations, the first controller 203 receives 610 data describing a management action performed by a second user on the first user's engagement action. For example, the management action describes that the second user approves or rejects to include in the first user's engagement action in the second user's unlocked topic. The reputation score module 209 determines 612 a first set of impact scores based on the second user's management action. The reputation score module 209 adjusts 614 the first topical reputation score based on the first set of impact scores.

Figure 6B:
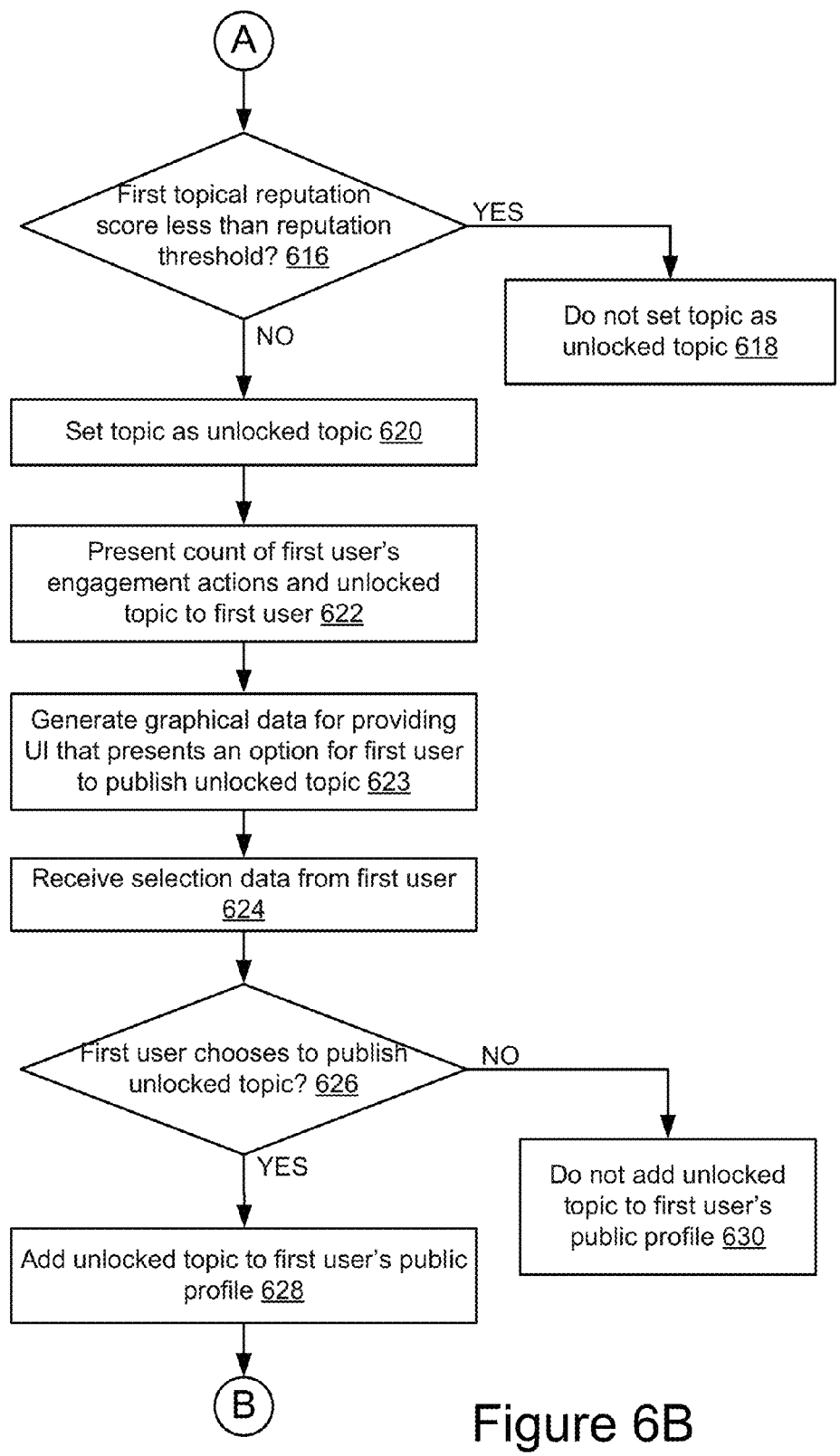

Referring to FIG. 6B, the unlocking module 211 determines 616 whether the first topical reputation score is less than a reputation threshold. If the first topical reputation score is less than the reputation threshold, the unlocking module 211 does not set 618 the topic as an unlocked topic. Otherwise, the unlocking module 211 sets 620 the topic as an unlocked topic. Optionally, the presentation module 217 presents 622 a count of the first user's engagement actions and the unlocked topic to the first user. The first user interface module 219 generates 623 graphical data for providing a user interface that presents an option for the first user to publish the unlocked topic. The first controller 203 receives 624 selection data from the first user via the user interface. The unlocking module 211 determines 626 whether the first user chooses to publish the unlocked topic based on the selection data. If the first user selects to publish the unlocked topic, the unlocking module 211 adds 628 the unlocked topic to the first user's public profile. Otherwise, the unlocking module 211 does not add 630 the unlocked topic to the first user's public profile.

Figure 6C:
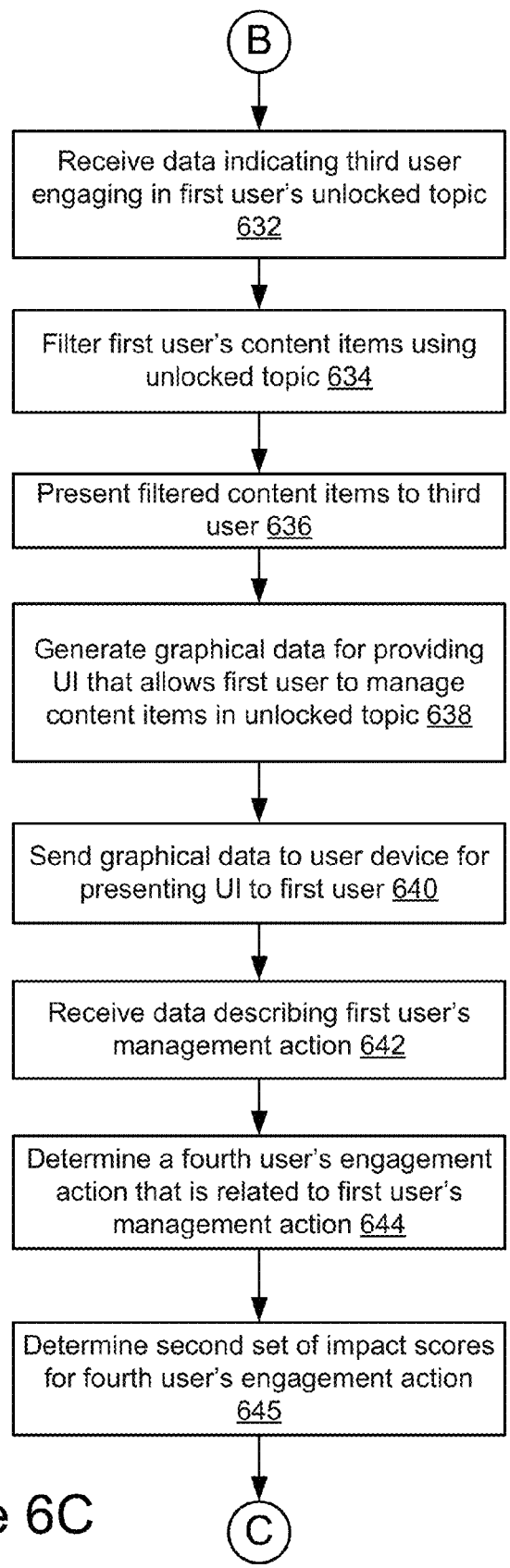

Referring to FIG. 6C, the first controller 203 receives 632 data indicating a third user engages in the first user's unlocked topic. The filtering module 213 filters 634 the first user's content items using the unlocked topic. The presentation module 217 presents 636 the filtered content items to the third user. The first user interface module 219 generates 638 graphical data for providing a user interface that allows the first user to manage content items included in the unlocked topic. The first controller 203 sends 640 the graphical data to a user device 115 for presenting the user interface to the first user on the user device 115. The first controller 203 receives 642 data describing a first user's management action via the user interface. The reputation score module 209 determines 644 a fourth user's engagement action related to the first user's management action. For example, the reputation score module 209 determines a fourth user's sharing of a content item that the first user approves or rejects to include in the first user's unlocked topic. The reputation score module 209 determines 645 a second set of impact scores for the fourth user's engagement action.

Figure 6D:
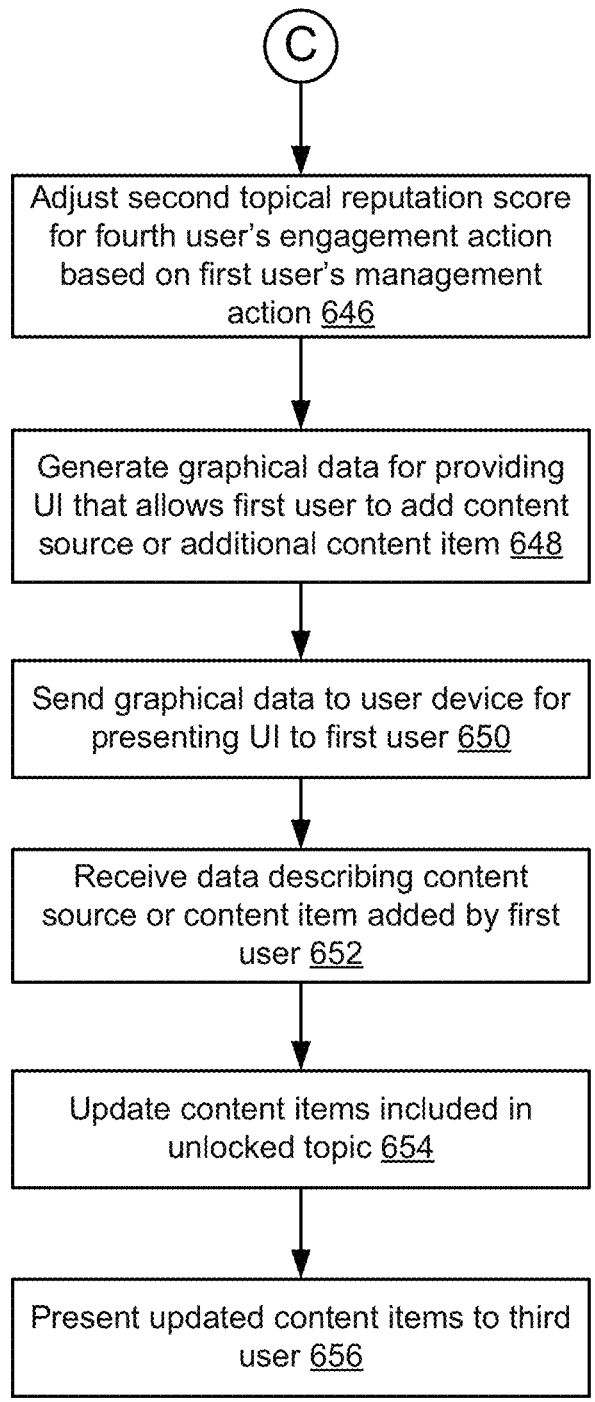

Referring to FIG. 6D, the reputation score module 209 adjusts 646 a second topical reputation score for the fourth user's engagement action based on the first user's management action. In some implementations, the first user interface module 219 generates 648 graphical data for providing a user interface that allows the first user to add one or more content sources or additional content items to the unlocked topic. The first controller 203 sends 650 the graphical data to the user device 115 for presenting the user interface to the first user. The second controller 203 receives 652 data describing one or more content sources or additional content items added by the first user via the user interface. The presentation module 217 updates 654 the content items included in the unlocked topic based on the one or more content sources or additional content items. The presentation module 217 presents 656 the updated content items to the third user (e.g., a follower of the unlocked topic) based on the unlocked topic.

FIG. 7 is a graphic representation 700 of an example user interface for providing a topic recommendation to a user. The user can add a topic to a content item by selecting a favorite topic or providing a new topic as illustrated in a box 702.

Figure 8A:
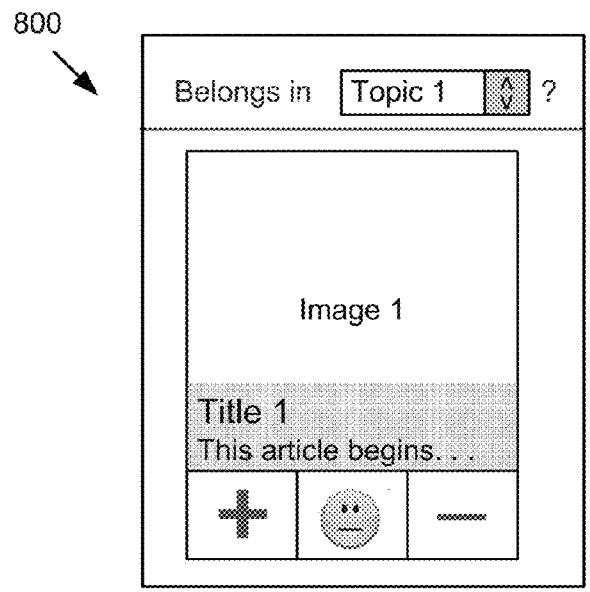
Figure 8B:
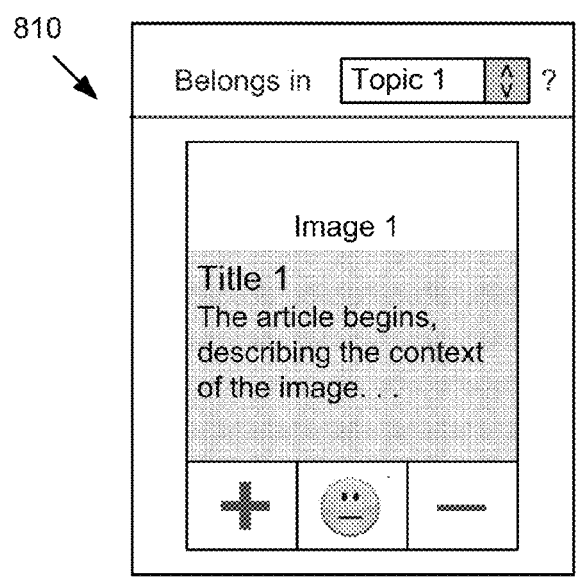

FIGS. 8A-8E are graphic representations 800, 810, 820, 830, 840 of example user interfaces for editing a topic for a content item. If a user hovers over Image 1 illustrated in FIG. 8A using a cursor, a description for Image 1 will expand over the image as shown in FIG. 8B. In FIG. 8C, the example user interface does not show Image 1 and displays full text for the description. If the user hovers over a button 832 illustrated in FIG. 8D, an explanation for the button 832 can be shown in the user interface as a message 834. If the user clicks on the button 832, a topic "Topic 1" can be added to the content item. FIG. 8E illustrates a message describing that the editing for Topic 1 completes and suggesting the user to edit other topics.

Figure 9:
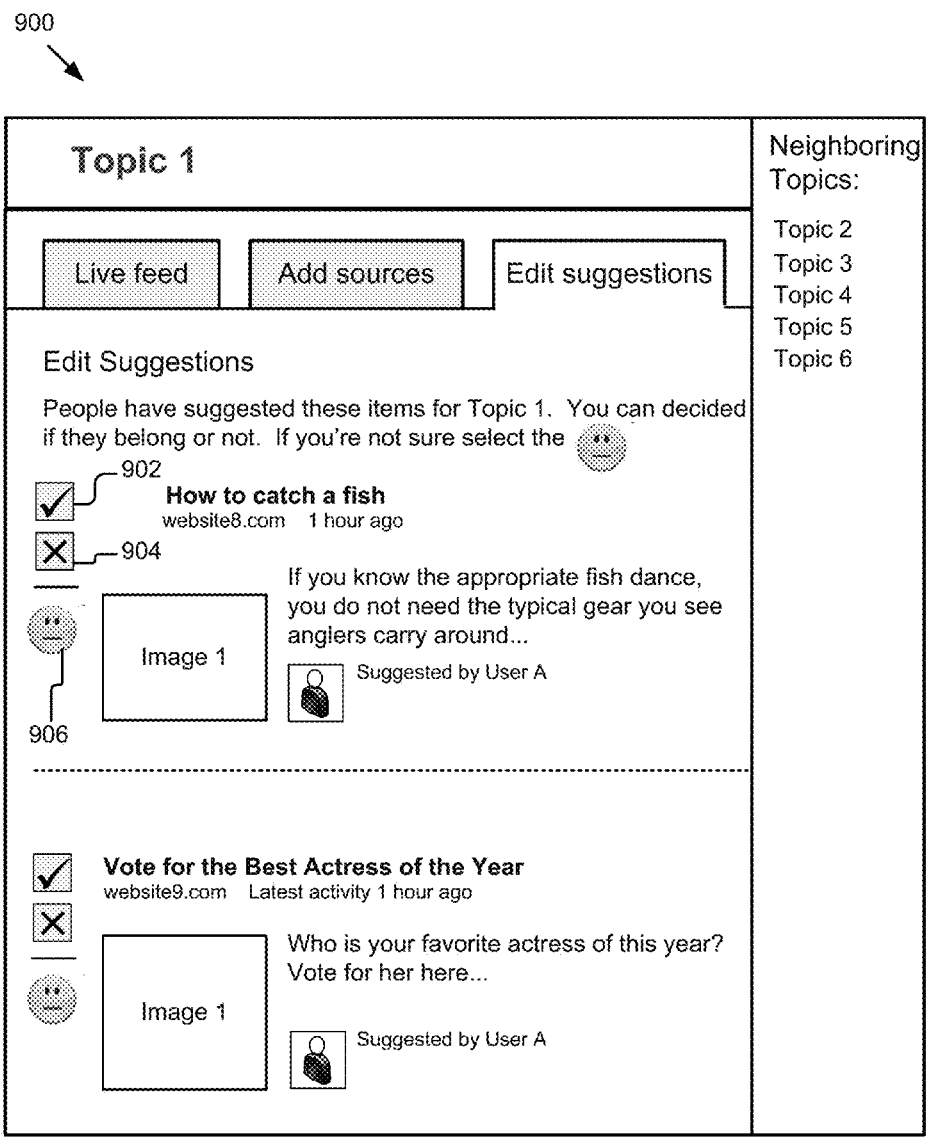
FIG. 9 is a graphic representation of another example user interface for editing a topic for a content item.

FIG. 9 is a graphic representation 900 of another example user interface for editing a topic for a content item. A user can select a button 902 to confirm that the content item belongs to a suggested topic, select a button 904 to indicate that the content item does not belong to the suggested topic or select an emoting icon 906 if the user does not know whether the content item belongs to the suggested topic or not.

Figure 10:
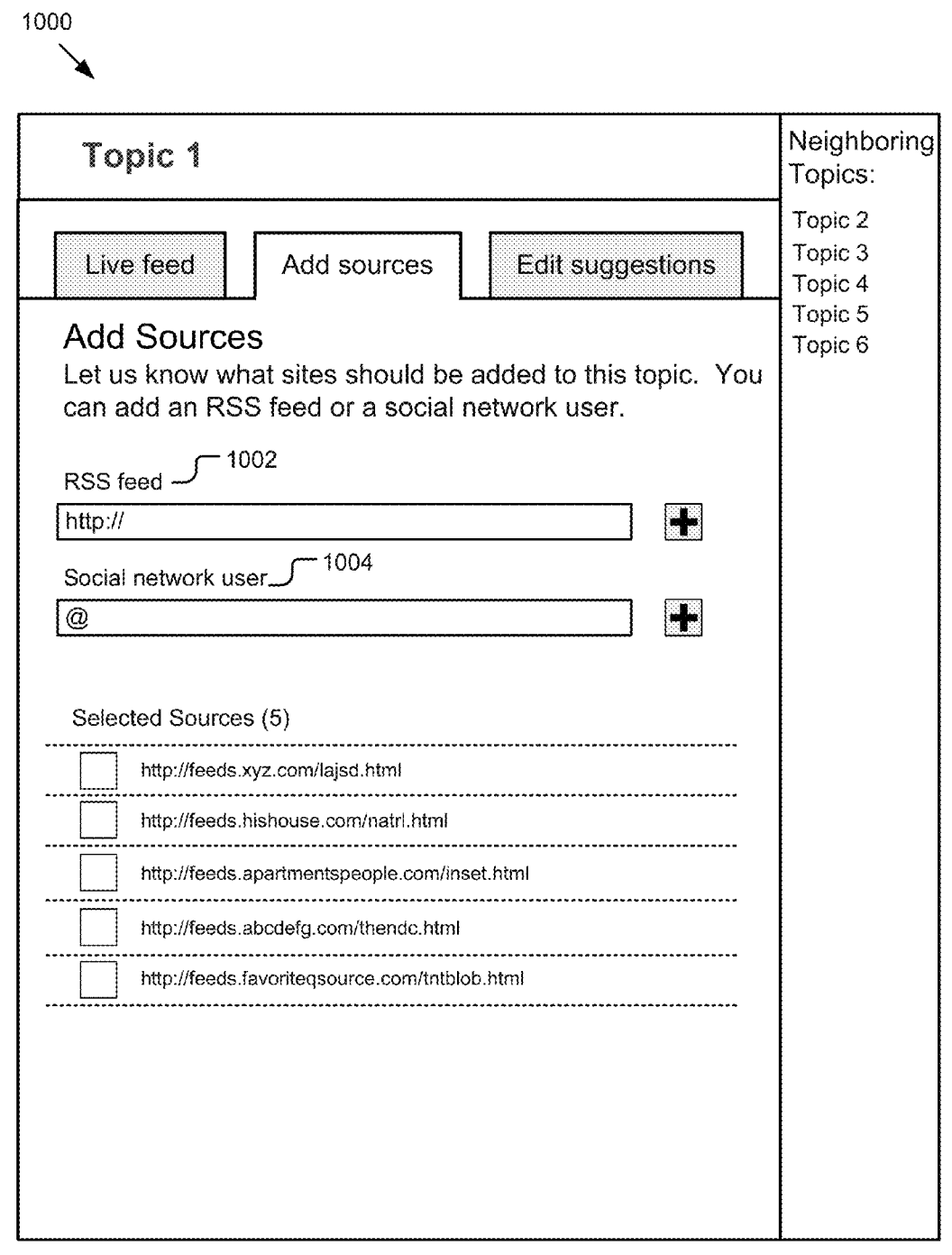

FIG. 10 is a graphic representation 1000 of an example user interface for adding a content source to a topic. A content source can be a RSS feed 1002 or a social network user account 1004.

Figure 11:
FIG. 11 is a graphic representation of yet another example user interface for editing a topic for a content item.

FIG. 11 is a graphic representation 1100 of yet another example user interface for editing a topic for a content item. For example, a user can select a topic 1102 for the content item by clicking on the topic 1102.

Figure 12A:
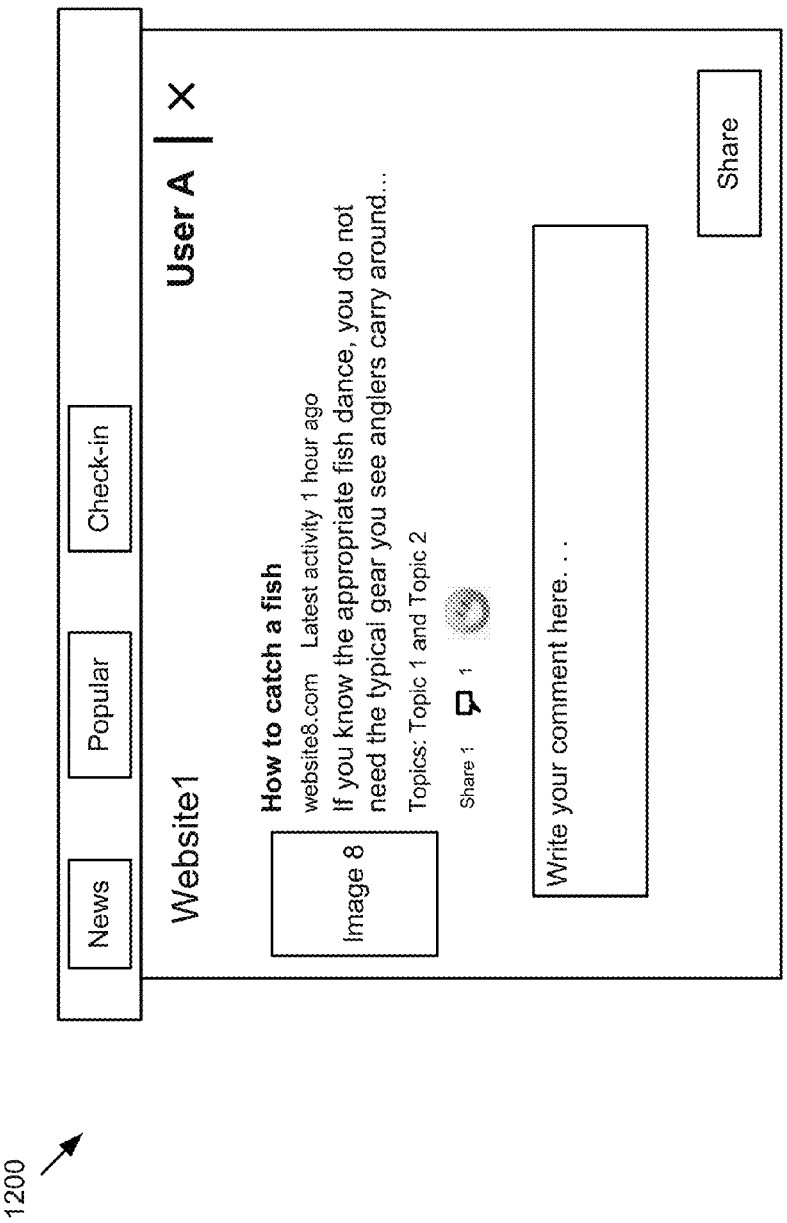
Figure 12B:
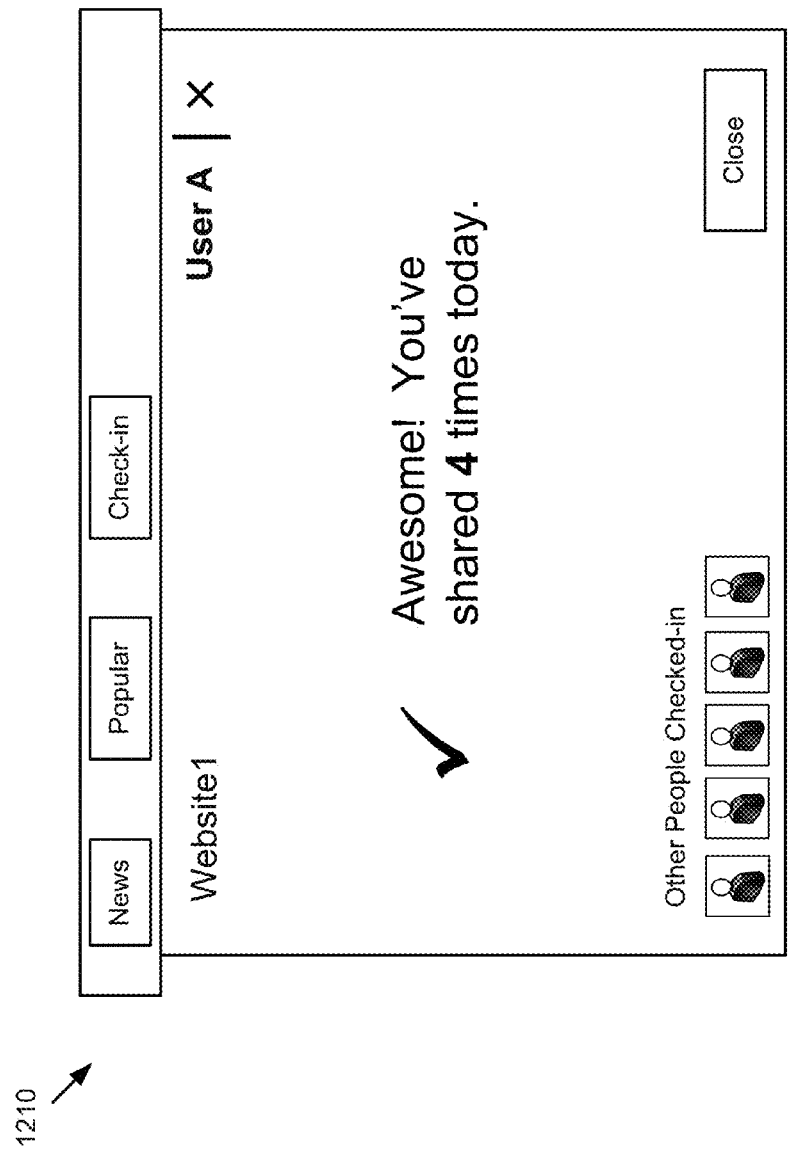
Figure 12C:
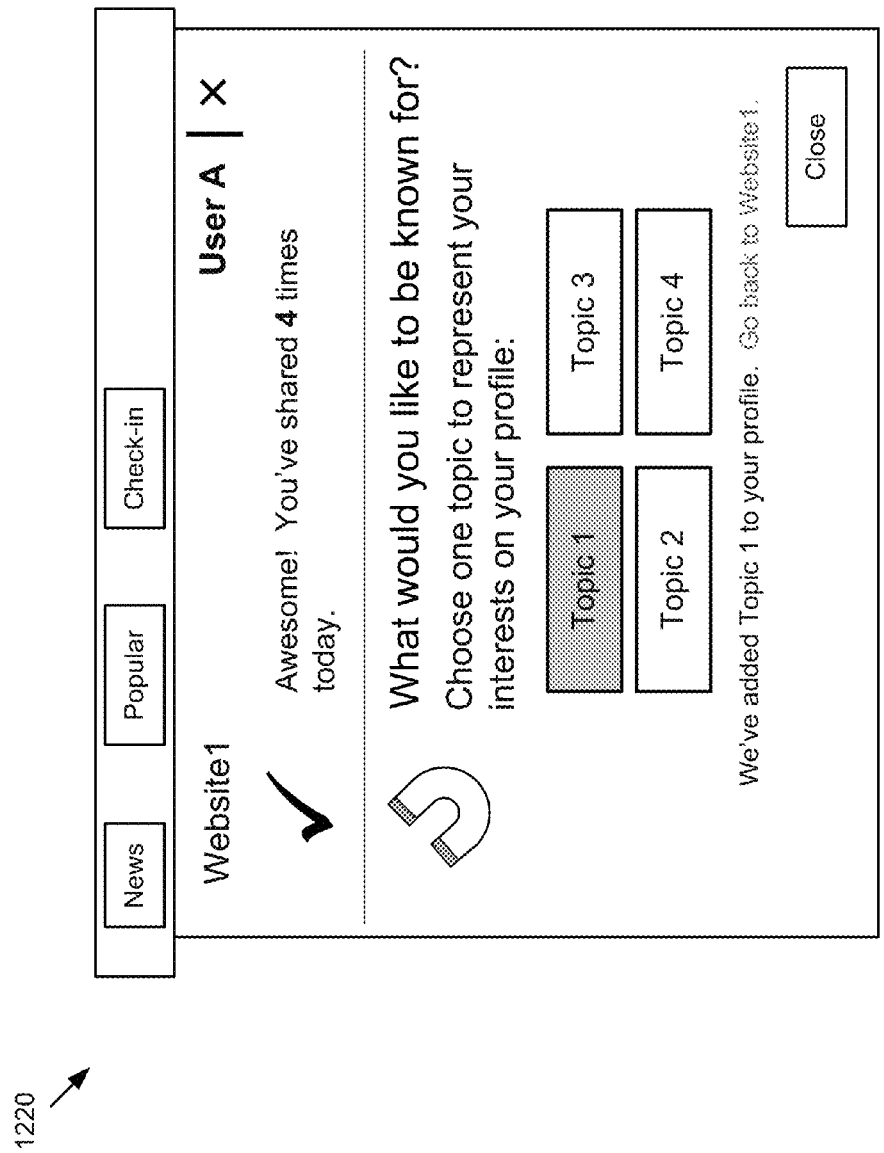
Figure 12E:
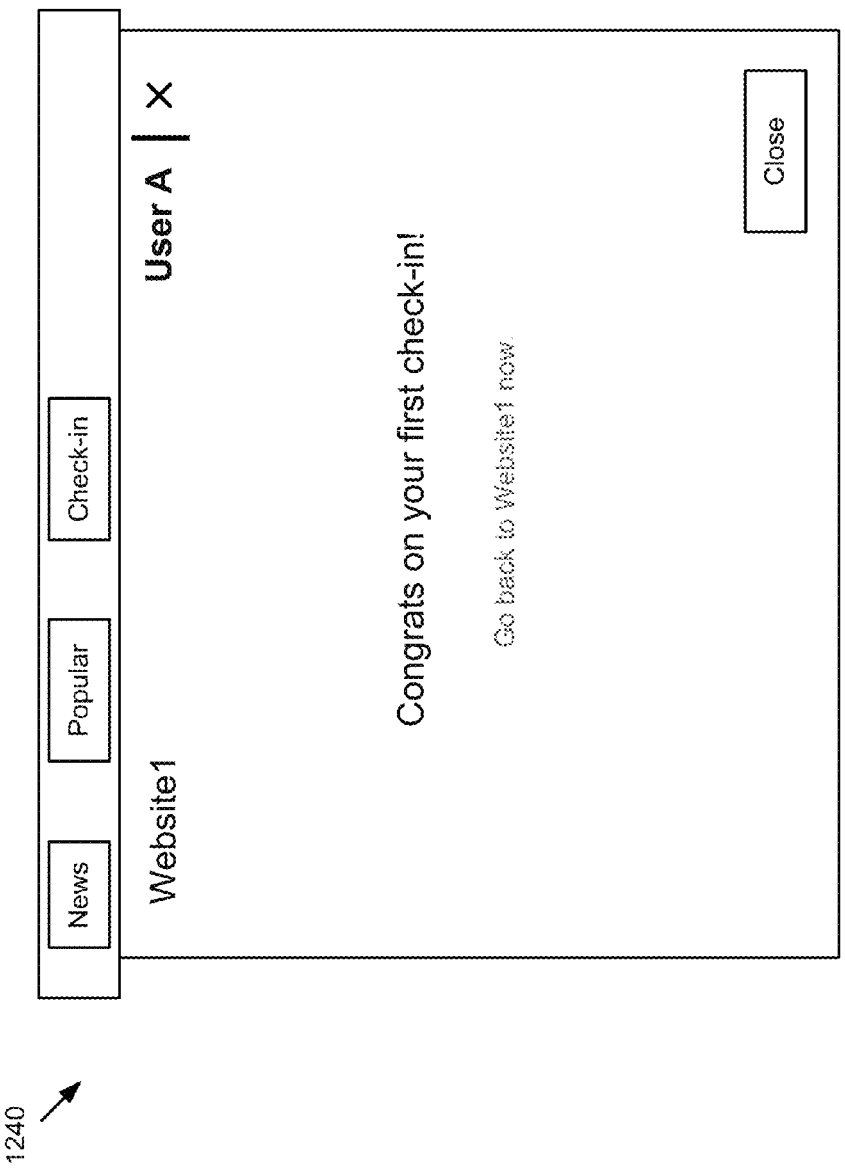

FIGS. 12A-12E are graphic representations 1200, 1210, 1220, 1230, 1240 of example user interfaces for unlocking a topic for a user. FIG. 12A illustrates a content item shared by the user. FIG. 12B presents a count of sharings that the user performed in a day. FIG. 12C illustrates an example user interface allowing a user to add an unlocked topic in the public profile. After selecting a topic (e.g., Topic 1), FIG. 12D shows an example user interface that requests the user to sign in. FIG. 12E shows an example user interface greeting the user after signing in.

Figure 13A:
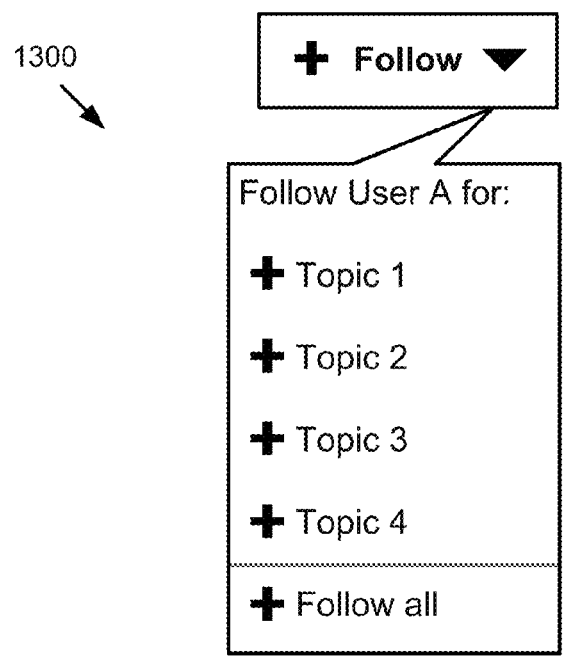
FIGS. 13A-13D are graphic representations of example user interfaces for engaging in a topic.
Figure 13B:
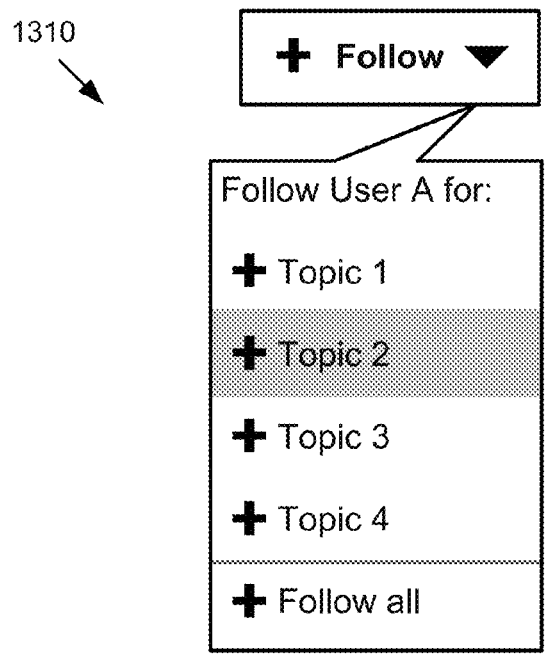
Figure 13C:
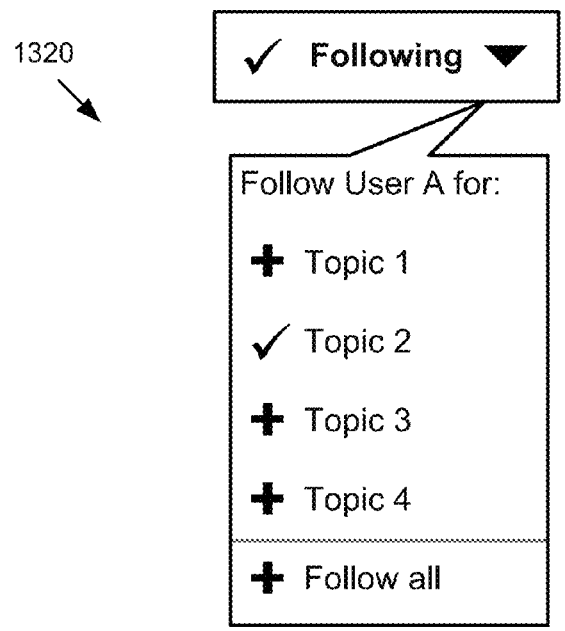
Figure 13D:
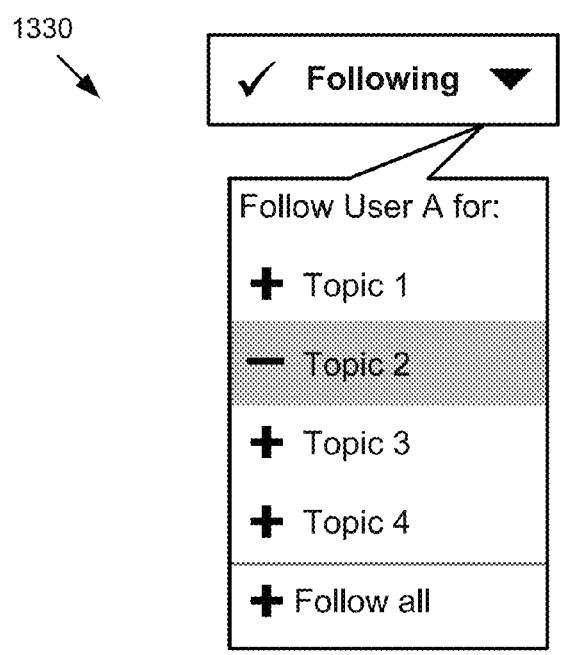

FIGS. 13A-13D are graphic representations 1300, 1310, 1320, 1330 of example user interfaces for engaging in a topic. FIG. 13A depicts one or more topics that a user can follow. The user can select a topic (e.g., Topic 2) to follow as shown in FIG. 13B. FIG. 13C shows that Topic 2 has been selected by the user to follow. The user can also remove the selection of Topic 2 by clicking on Topic 2 again as shown in FIG. 13D.

Figure 14:
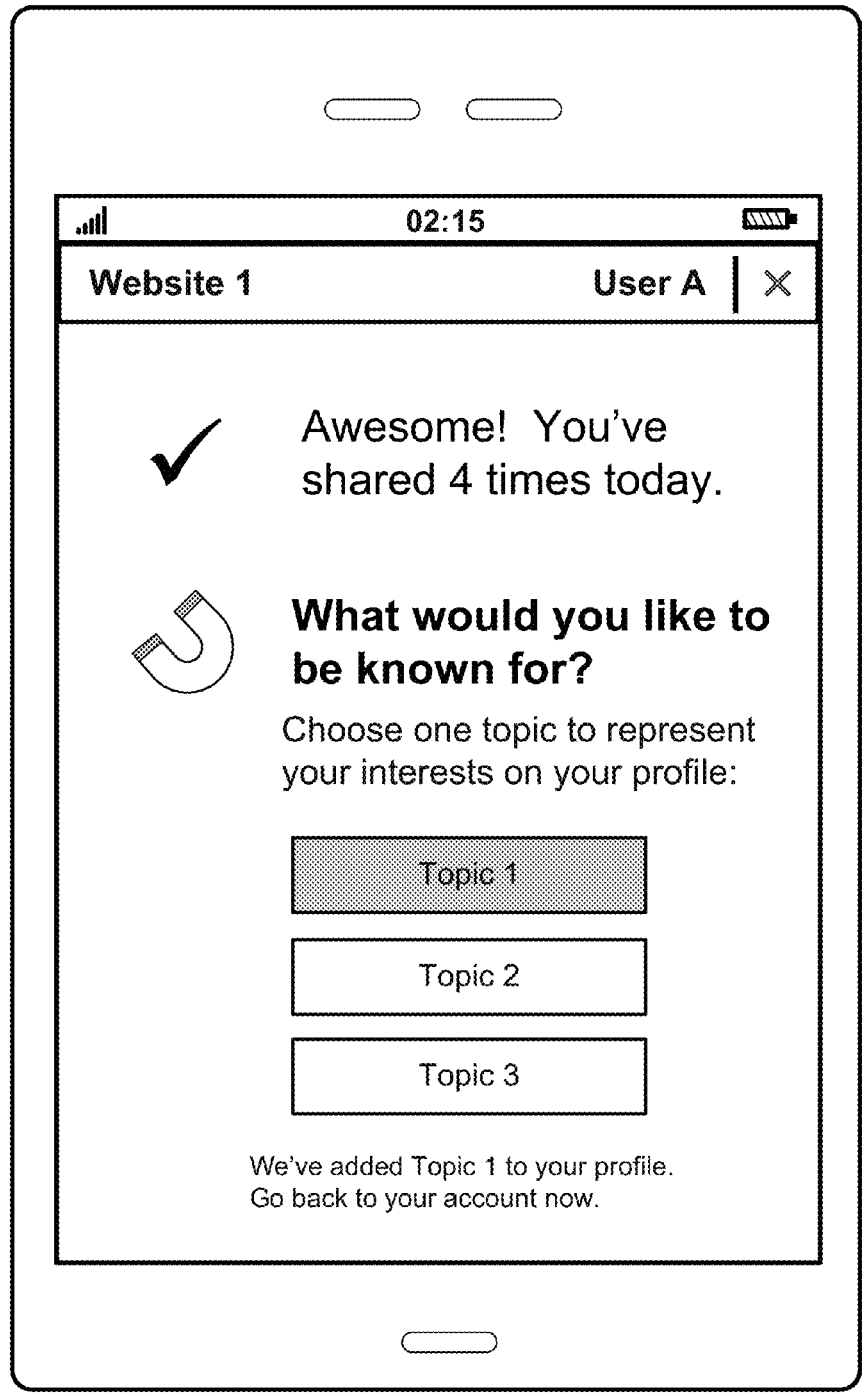
FIG. 14 is a graphic representation of another example user interface for unlocking a topic for a user.

FIG. 14 is a graphic representation 1400 of another example user interface for unlocking a topic for a user. The user can select a topic (e.g., Topic 1) to add to the public profile.

Figure 15:
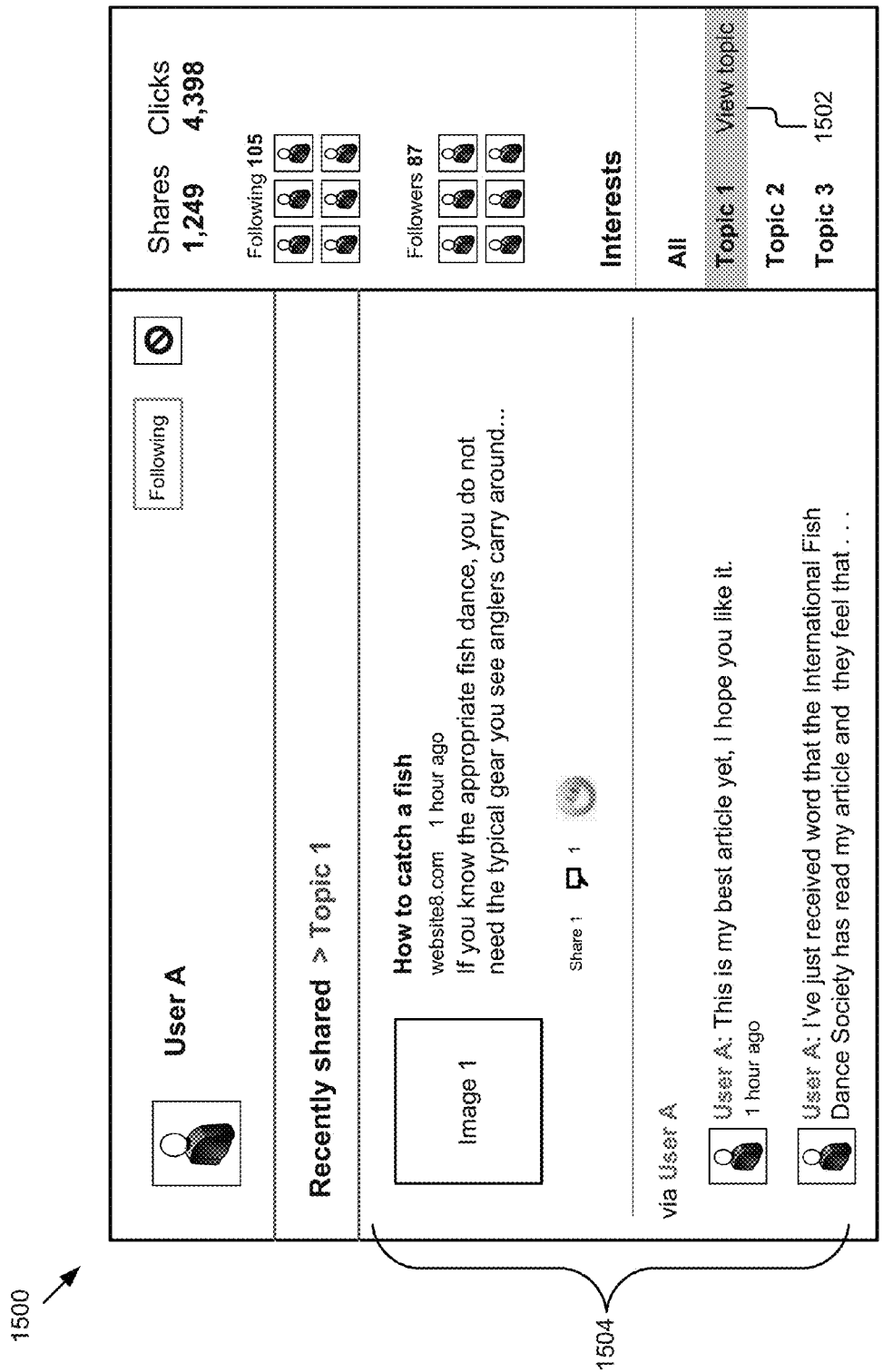
FIG. 15 is a graphic representation of an example user interface for providing content associated with an unlocked topic to a user.

FIG. 15 is a graphic representation 1500 of an example user interface for providing content associated with an unlocked topic to a user. If a user selects a topic 1502, the content included in the selected topic 1502 can be shown in Section 1504.

Figure 16:
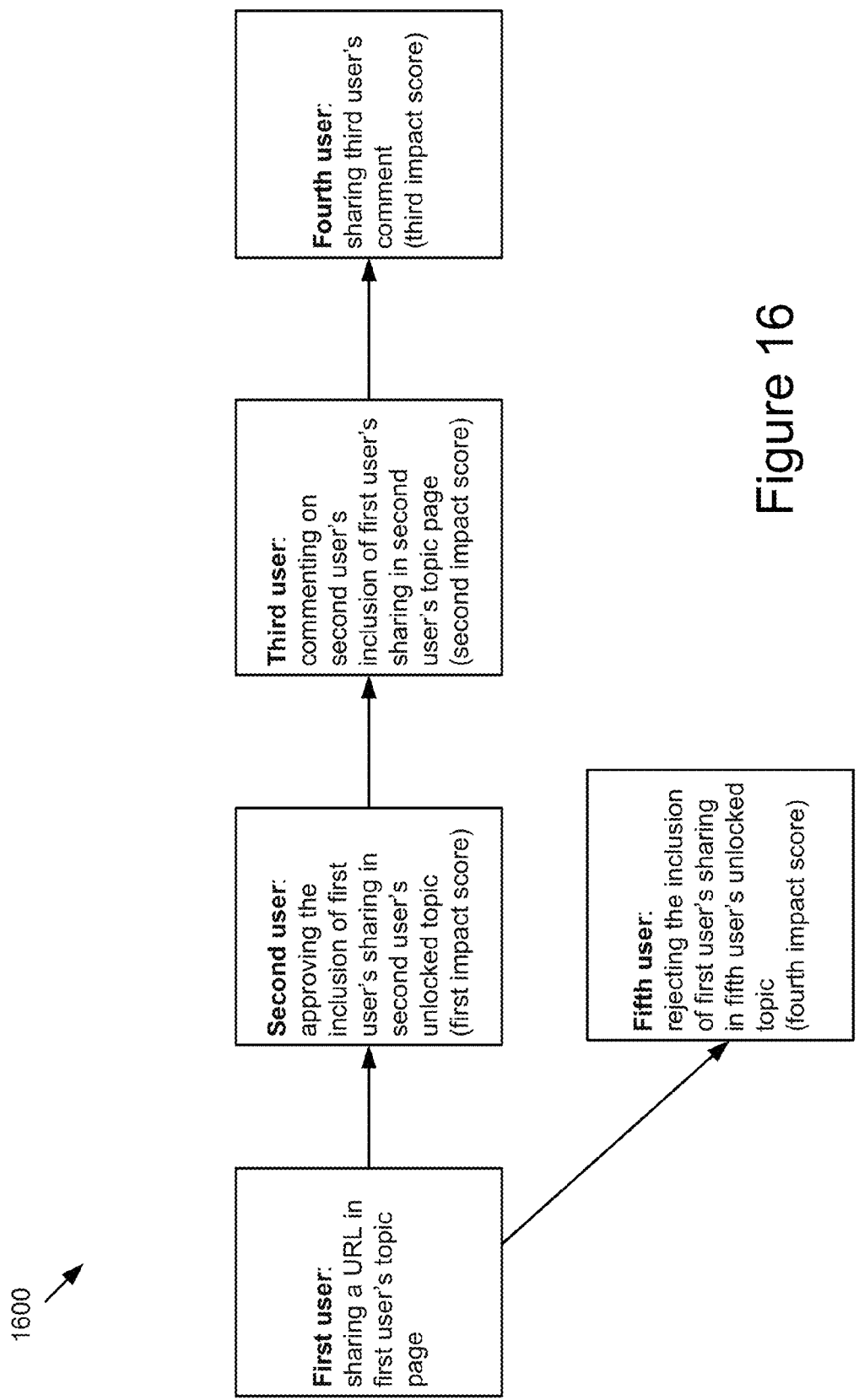
FIG. 16 is a graphic representation illustrating example management actions and example engagement actions associated with the management actions.

FIG. 16 is a graphic representation 1600 illustrating example management actions and example engagement actions associated with the management actions. In the illustrated example, a first user shares a URL in the first user's topic page. The first user identifies the URL related to a first topic. A second user manages a first unlocked topic and approves the inclusion of the first user's sharing in the first unlocked topic. The first unlocked topic may be similar to or the same as the first topic. The reputation score module 209 determines a first impact score for the first user's sharing based on the second user's management action. A third user comments on the second user's inclusion of the first user's sharing in the second user's topic page. The reputation score module 209 determines a second impact score for the first user's sharing based on the third user's commenting. A fourth user shares the third user's comment on the fourth user's topic page. The reputation score module 209 determines a third impact score for the first user's sharing based on the fourth user's sharing of the comment. The first, second and third impact scores form a chain of impact scores for the first user's sharing.

A fifth user manages a second unlocked topic and rejects the inclusion of the first user's sharing in the second unlocked topic. The second unlocked topic can be the same as or similar to the first topic. The reputation score module 209 determines a fourth impact score for the first user's sharing based on the fifth user's management action. The reputation score module 209 adjusts a topical reputation score for the first topic based on the first impact score, the second impact score, the third impact score and the fourth impact score.

In the above description, for purposes of explanation, numerous specific details are set forth in order to provide a thorough understanding of the specification. It will be apparent, however, to one skilled in the art that the disclosure can be practiced without these specific details. In other instances, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this patent application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
receiving data indicating a first engagement action associated with a content item, the first engagement action performed by a first user;
determining a topic associated with the content item;
determining a first topical reputation score related to the topic for the first user based on one or more second engagement actions performed by one or more second users associated with the content item;
determining that first the topical reputation score of the first user satisfies a reputation threshold;
unlocking the topic for the first user responsive to the determination that the first topical reputation score of the first user satisfies the reputation threshold; and
responsive to unlocking the topic for the first user,
providing the first user with an ability to curate another content item for the unlocked topic;
receiving, from the first user, a management action including one of an approval and a rejection to include the another content item in the unlocked topic; and
modifying a second topical reputation score related to the unlocked topic of another user based on the management action by the first user.

2. The method of claim 1, wherein the first engagement action includes the first user publishing a uniform resource locator associated with the content item.

3. The method of claim 1, wherein the one or more second engagement actions include an indication of whether the one or more second users approve of the content item.

4. The method of claim 1, further comprising:
responsive to unlocking the topic for the first user, providing the first user with an ability to control how one or more second content items appear in a feed associated with the unlocked topic.

5. The method of claim 4, wherein the one or more second content items are provided by one or more third users that are different than the first user.

6. A method comprising:
receiving data indicating an engagement action associated with a content item, the engagement action performed by a first user and the content item associated with a topic;
determining a first topical reputation score related to the topic for the first user based on one or more other engagement actions associated with the content item;
receiving data describing a second management action performed by a second user on the content item, where the second user has abilities to curate content items associated with the topic, the second management action including one of an approval and a rejection to include the content item in the topic;
determining a first set of impact scores for the second management action performed by the second user; and
adjusting the first topical reputation score for the first user based on the first set of impact scores.

7. The method of claim 6, wherein the first set of impact scores includes a first impact score generated by the second management action and a second impact score generated by a new engagement action established upon the second management action.

8. The method of claim 7, wherein adjusting the first topical reputation score comprises adjusting the first topical reputation score based on a weighted sum of the first impact score and the second impact score.

9. The method of claim 6, wherein the second management action includes an acknowledgement of relevance between the content item and the topic.

10. The method of claim 6, wherein the first set of impact scores includes a time-evolving modeling of one or more impact scores that affect the first topical reputation score.

11. The method of claim 6, wherein the engagement action includes sharing a uniform resource locator associated with the content item.

12. A system comprising:
a processor; and
a memory storing instructions that, when executed, cause the system to:
receive data indicating an engagement action associated with a content item, the engagement action performed by a first user and the content item associated with a topic;
determine a first topical reputation score related to the topic for the first user based on one or more other engagement actions associated with the content item;
receive data describing a second management action performed by a second user on the content item, where the second user has abilities to curate content items associated with the topic, the second management action including one of an approval and a rejection to include the content item in the topic;
determine a first set of impact scores for the second management action performed by the second user; and
adjust the first topical reputation score for the first user based on the first set of impact scores.

13. The system of claim 12, wherein the first set of impact scores includes a first impact score generated by the second management action and a second impact score generated by a new engagement action established upon the second management action.

14. The system of claim 13, wherein adjusting the first topical reputation score comprises adjusting the first topical reputation score based on a weighted sum of the first impact score and the second impact score.

15. The system of claim 12, wherein the second management action includes an acknowledgement of relevance between the content item and the topic.

16. The system of claim 12, wherein the first set of impact scores includes a time-evolving modeling of one or more impact scores that affect the first topical reputation score.

17. The system of claim 12, wherein the engagement action includes sharing a uniform resource locator associated with the content item.

18. A computer program product comprising a non-transitory computer usable storage medium including a computer readable program, wherein the computer readable program when executed on a computer causes the computer to:
receive data indicating an engagement action associated with a content item, the engagement action performed by a first user and the content item associated with a topic;
determine a first topical reputation score related to the topic for the first user based on one or more other engagement actions associated with the content item;
receive data describing a second management action performed by a second user on the content item, where the second user has abilities to curate content items associated with the topic, the second management action including one of an approval and a rejection to include the content item in the topic;

determine a first set of impact scores for the second management action performed by the second user; and adjust the first topical reputation score for the first user based on the first set of impact scores.

19. The computer program product of claim 18, wherein the first set of impact scores includes a first impact score generated by the second management action and a second impact score generated by a new engagement action established upon the second management action.

20. The computer program product of claim 19, wherein the first set of impact scores includes a time-evolving modeling of one or more impact scores that affect the first topical reputation score and adjusting the first topical reputation score comprises adjusting the first topical reputation score based on a weighted sum of the first impact score and the second impact score.

* * * * *

UNITED STATES PATENT AND TRADEMARK OFFICE
CERTIFICATE OF CORRECTION

| | | |
|---|---|---|
| PATENT NO. | : 9,436,709 B1 | Page 1 of 1 |
| APPLICATION NO. | : 13/743263 | |
| DATED | : September 6, 2016 | |
| INVENTOR(S) | : Mario Ventura Anima et al. | |

It is certified that error appears in the above-identified patent and that said Letters Patent is hereby corrected as shown below:

On the Title Page:

In the Abstract, at the third line of (57), please replace "when executed" with --that, when executed,--

In the Specification:

In column 1, line 14, please replace "users'" with --user's--

In column 1, line 59, please replace "en" with --an--

In column 10, line 9, please replace "users'" with --user's--

In column 10, line 16, please replace "users'" with --user's--

In column 10, line 18, please replace "users'" with --user's--

In column 23, line 52, please replace "but is not" with --but not--

Signed and Sealed this
First Day of November, 2016

Michelle K. Lee
*Director of the United States Patent and Trademark Office*